US010686698B2

(12) United States Patent
Zhang et al.

(10) Patent No.: US 10,686,698 B2
(45) Date of Patent: Jun. 16, 2020

(54) PACKET FORWARDING METHOD, APPARATUS, AND SYSTEM

(71) Applicant: Huawei Technologies Co., Ltd., Shenzhen (CN)

(72) Inventors: Junlin Zhang, Beijing (CN); Zhenbin Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 646 days.

(21) Appl. No.: 14/981,520

(22) Filed: Dec. 28, 2015

(65) Prior Publication Data

US 2016/0134525 A1 May 12, 2016

Related U.S. Application Data

(63) Continuation of application No. PCT/CN2014/080711, filed on Jun. 25, 2014.

(30) Foreign Application Priority Data

Jun. 30, 2013 (CN) .......................... 2013 1 0270968

(51) Int. Cl.
*H04L 29/12* (2006.01)
*H04L 12/723* (2013.01)
(Continued)

(52) U.S. Cl.
CPC .......... *H04L 45/50* (2013.01); *H04L 12/6418* (2013.01); *H04L 12/66* (2013.01);
(Continued)

(58) Field of Classification Search
CPC ..... H04L 12/6418; H04L 12/66; H04L 45/50; H04L 45/74; H04L 49/351;
(Continued)

(56) References Cited

U.S. PATENT DOCUMENTS 6,553,423 B1 4/2003 Chen
7,519,010 B1 4/2009 Aggarwal et al.
(Continued)

FOREIGN PATENT DOCUMENTS

CN 101610208 A 12/2009
CN 102244615 A 11/2011
(Continued)

OTHER PUBLICATIONS

Sajassi et al., "BGP MPLS Based Ethernet VPN," Network Working Group, Internet-Draft, Internet Engineering Task Force, Reston, Virginia (Feb. 25, 2013).
(Continued)

*Primary Examiner* — Robert J Lopata
(74) *Attorney, Agent, or Firm* — Leydig, Voit & Mayer Ltd.

(57) ABSTRACT

The present application discloses a packet forwarding method, including: determining, by an Ingress PE in an Ethernet virtual private network instance (EVI), that a state of the EVI on a first Egress PE is Active, where an Ethernet virtual private network (EVPN) corresponding to the EVI includes a first CE; determining, by the Ingress PE, that a state of the EVI on a second Egress PE is Inactive; skipping, by the Ingress PE, forwarding a broadcast, unknown unicast, and multicast BUM packet to the second Egress PE, where the BUM packet is from the first CE; and forwarding, by the Ingress PE, the BUM packet to the first Egress PE. Repeated BUM traffic that is transmitted in a bearer network and is not finally sent to a remote site is reduced; therefore, a waste of bandwidth in the bearer network is reduced.

10 Claims, 19 Drawing Sheets

(51) Int. Cl.
*H04L 12/66* (2006.01)
*H04L 12/64* (2006.01)
*H04L 12/741* (2013.01)
*H04L 12/931* (2013.01)
*H04L 29/08* (2006.01)

(52) U.S. Cl.
CPC ............ *H04L 45/74* (2013.01); *H04L 49/351* (2013.01); *H04L 61/2007* (2013.01); *H04L 69/325* (2013.01)

(58) Field of Classification Search
CPC ............... H04L 61/2007; H04L 69/325; H04L 29/06095; H04L 29/0653; H04L 49/3009; H04L 49/309
USPC ......................................................... 370/392
See application file for complete search history.

(56) References Cited

U.S. PATENT DOCUMENTS

| | | | | |
|---|---|---|---|---|
| 8,295,160 | B2* | 10/2012 | Fujita | H04L 45/02 370/217 |
| 8,493,845 | B1* | 7/2013 | Saluja | H04L 1/22 370/228 |
| 8,705,526 | B1* | 4/2014 | Hasan | H04L 12/4633 370/216 |
| 2009/0089414 | A1* | 4/2009 | Jaladanki | H04L 41/0686 709/224 |
| 2009/0109869 | A1* | 4/2009 | Hsiao | H04L 12/4641 370/254 |
| 2009/0129260 | A1* | 5/2009 | Qian | H04L 41/0631 370/216 |
| 2011/0170403 | A1 | 7/2011 | Ashwood-Smith et al. | |
| 2011/0194404 | A1* | 8/2011 | Kluger | H04L 12/40189 370/218 |
| 2011/0286452 | A1 | 11/2011 | Balus et al. | |
| 2011/0286462 | A1* | 11/2011 | Kompella | H04L 45/18 370/395.53 |
| 2012/0106360 | A1* | 5/2012 | Sajassi | H04L 12/437 370/245 |
| 2012/0170449 | A1* | 7/2012 | Nakash | H04L 45/28 370/225 |
| 2012/0294193 | A1* | 11/2012 | Chen | H04L 12/4633 370/255 |
| 2013/0100854 | A1* | 4/2013 | Tatikonda | H04L 12/4675 370/254 |
| 2013/0121164 | A1* | 5/2013 | Shabtay | H04L 41/0663 370/241.1 |
| 2013/0148657 | A1* | 6/2013 | Salam | H04L 45/66 370/390 |
| 2013/0173788 | A1 | 7/2013 | Song | |
| 2013/0301472 | A1* | 11/2013 | Allan | H04L 45/66 370/254 |
| 2014/0022890 | A1* | 1/2014 | Dong | H04L 12/4641 370/219 |
| 2014/0126422 | A1* | 5/2014 | Bragg | H04L 12/462 370/255 |
| 2014/0226531 | A1* | 8/2014 | Farkas | H04L 41/0893 370/256 |
| 2014/0269746 | A1* | 9/2014 | Chinthalapati | H04L 45/245 370/409 |
| 2015/0010003 | A1* | 1/2015 | Song | H04L 12/4654 370/392 |
| 2015/0110111 | A1* | 4/2015 | Song | H04L 12/6418 370/392 |
| 2015/0249550 | A1* | 9/2015 | Wu | H04L 45/66 370/390 |
| 2016/0149724 | A1* | 5/2016 | Wang | H04L 12/46 370/392 |
| 2017/0085528 | A1* | 3/2017 | Zeng | H04L 45/02 |

FOREIGN PATENT DOCUMENTS

| | | |
|---|---|---|
| CN | 102413061 A | 4/2012 |
| CN | 102664788 A | 9/2012 |

OTHER PUBLICATIONS

Bates et al., "Multiprotocol Extensions for BGP-4," Network Working Group, Request for Comments: 4760, IETF Trust, Reston, Virginia (Jan. 2007).

Li et al., "Multicast State Advertisement in E-VPN," Network Working Group, Internet-Draft, draft-li-12vpn-evpn-mcast-state-ad-00, pp. 1-7, IETF Trust, Reston, Virginia (Jul. 13, 2013).

Aggarwal et al., "BGP MPLS Based Ethernet VPN," Network Working Group, Internet Draft, draft-raggarwa-sajassi-12vpn-evpn-04.txt, pp. 1-42, IETF Trust, Reston, Virginia (Sep. 12, 2011).

\* cited by examiner

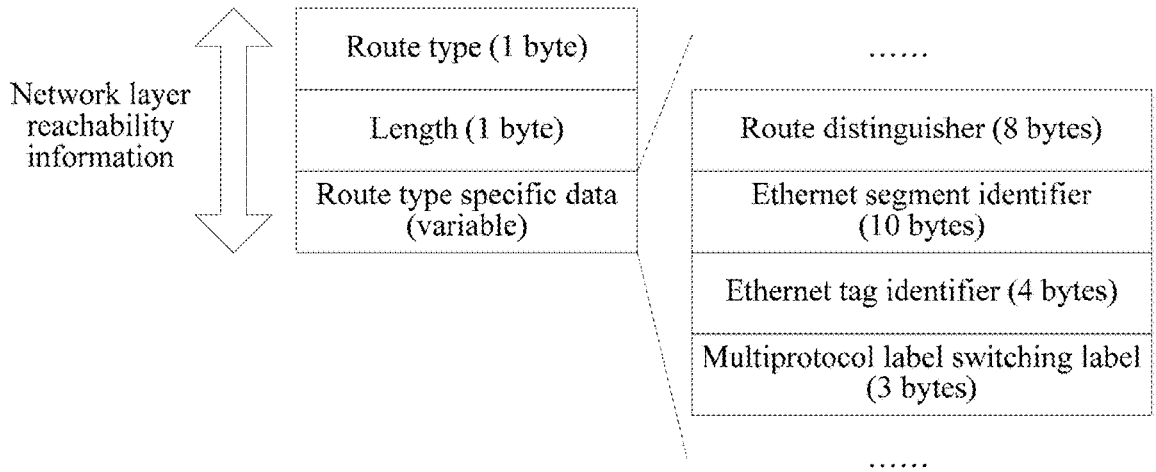
FIG. 5
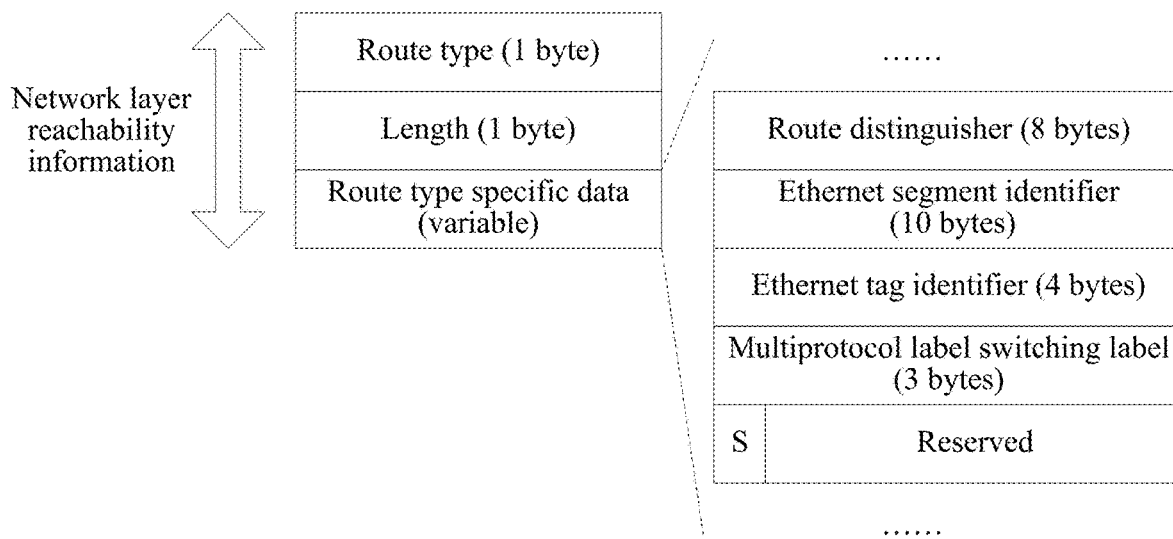
FIG. 6a
FIG. 6b

PACKET FORWARDING METHOD, APPARATUS, AND SYSTEM

CROSS-REFERENCE TO RELATED APPLICATIONS

This application is a continuation of International Patent Application No. PCT/CN2014/080711, filed on Jun. 25, 2014, which claims priority to Chinese Patent Application No. 201310270968.1, filed on Jun. 30, 2013, both of which are hereby incorporated by reference in their entireties.

TECHNICAL FIELD

The present application relates to the field of network communications technologies, and in particular, to a packet forwarding method, a packet forwarding apparatus, and a packet forwarding system.

BACKGROUND

An Ethernet virtual private network (EVPN) refers to a technology that is implemented based on an Internet Protocol (IP) and multiprotocol label switching (MPLS), and is used to connect customer sites in different areas, so that users in the customer sites in the different areas can work just like in a same site, where the customer site may be a local area network (LAN).

The EVPN includes an IP/MPLS bearer network of an operator and multiple customer sites, and all the customer sites are independent of each other, and can interwork each other only by using the IP/MPLS bearer network. For the convenience of understanding, FIG. 1 gives a schematic structural diagram of an EVPN, where a service provider edge (PE) device is an edge device that is on the bearer network, is connected to a customer site, and provides a VPN service, and is a start point or an end point of a VPN service. The PE device may be a PE router, and is referred to as PE for short below in this application. A customer edge (CE) device provides, for a user in a customer site, a connection to the PE, and is referred to as CE for short below in this application. Site 1 to Site 5 in FIG. 1 are 5 different customer sites separately, and each customer site is connected to a PE in the bearer network through a CE. Site 1 and Site 4 form an EVPN A by using the bearer network, and Site 2, Site 3, and Site 5 form an EVPN B by using the bearer network. For a packet, an ingress (Ingress) PE is a PE that is connected to a CE in a customer site in which a transmitter of the packet is located, and sends the packet to the bearer network; an egress (Egress) PE is a PE that is connected to a CE in a customer site in which a receiver of the packet is located. For example, for a packet sent by a user A to a user E, a PE 1 is an Ingress PE, and a PE 3 is an Egress PE. If one PE is connected to multiple customer sites belonging to different EVPNs, processing, such as forwarding packets sent by customer sites belonging to different EVPNs is separately implemented on the PE by using a corresponding EVPN instance (EVI). The Ingress PE and the Egress PE are PEs in a same EVI.

Packet forwarding in the EVPN includes: sending, by the PE to another local site or a remote site, where the another local site and the remote site belong to a same EVPN, a unicast packet and a broadcast, unknown unicast, and multicast (BUM) packet that are sent by a local site, and sending, by the PE to the local site, a unicast packet and a BUM packet that are sent by the remote site. Packet forwarding between the local site and the remote site is implemented together by using a public network tunnel and a private network tunnel, where the public network tunnel and the private network tunnel are established between PE devices, the public network tunnel performs packet forwarding between the PEs, and the private network tunnel is used to distinguish different EVIs of a same PE.

In order to send a BUM packet in an EVPN to a destination effectively in a packet forwarding process, an existing PE may implement packet forwarding in the following "ingress replication" manner:

An Ingress PE separately sends BUM traffic sent by one customer site to each of other PEs in a same EVI, that is, each of other PEs in a same EVI is the Egress PE. For example, for a BUM packet sent by Site 1, the PE 1 is an Ingress PE, the PE 2 and the PE 3 are Egress PEs, and the PE 1 separately sends the BUM packet sent by Site 1 to the PE 2 and the PE 3, so as to implement BUM packet forwarding.

In a BUM packet forwarding process, if a multihoming phenomenon exists in an EVPN, not all Egress PEs finally send the BUM packet sent by the Ingress PE to a remote site, which causes a waste of bandwidth in a bearer network.

SUMMARY

Embodiments of the present application provide a packet forwarding method and a packet forwarding system, which are used to reduce a waste of bandwidth in a bearer network in the prior art.

Correspondingly, the embodiments of the present application further provide a packet forwarding apparatus.

Technical solutions provided in the embodiments of the present application are as follows:

According to a first aspect, a packet forwarding method includes: determining, by an Ingress PE in an EVI, that a state of the EVI on a first Egress PE is Active, where an EVPN corresponding to the EVI includes a first CE; determining, by the Ingress PE, that a state of the EVI on a second Egress PE is Inactive; skipping, by the Ingress PE, forwarding a BUM packet to the second Egress PE, where the BUM packet is from the first CE; and forwarding, by the Ingress PE, the BUM packet to the first Egress PE.

In a first possible implementation manner of the first aspect, the determining, by an Ingress PE, that a state of the EVI on a first Egress PE is Active includes: receiving, by the Ingress PE, a first Border Gateway Protocol update BGP UPDATE message sent by the first Egress PE, where the first BGP UPDATE message indicates that the state of the EVI on the first Egress PE is Active; and determining, by the Ingress PE according to the first BGP UPDATE message, that the state of the EVI on the first Egress PE is Active.

With reference to the first possible implementation manner of the first aspect, in a second possible implementation manner of the first aspect, the first BGP UPDATE message is sent to the Ingress PE when the first Egress PE determines that the state of the EVI on the first Egress PE is Active, the first BGP UPDATE message includes first EVPN network layer reachability information (NLRI), the first EVPN NLRI includes a first route type field and a first route distinguisher (RD) field, content of the first route type field is 3, and the first RD field carries an RD of the EVI on the first Egress PE.

With reference to the first possible implementation manner of the first aspect, in a third possible implementation manner of the first aspect, the first BGP UPDATE message includes first EVPN NLRI, the first EVPN NLRI includes a first route type field, a first route distinguisher RD field, and a first state indication field, content of the first route type field indicates that the first EVPN NLRI carries information about a state of an EVI, the first RD field carries an RD of the EVI on the first Egress PE, and when content of the first state indication field is a first value, it is identified that the state of the EVI corresponding to the RD is Active.

With reference to the first possible implementation manner of the first aspect, in a fourth possible implementation manner of the first aspect, the first BGP UPDATE message includes first EVPN network layer reachability information NLRI and a first extended community attribute corresponding to the first EVPN NLRI, the first EVPN NLRI includes a first route distinguisher RD field, the first extended community attribute includes a first type field and a first state indication field, content of the first type field indicates that the first extended community attribute carries information about a state of an EVI, the first RD field carries an RD of the EVI on the first Egress PE, and when content of the first state indication field is a first value, it is identified that the state of the EVI corresponding to the RD is Active.

In a fifth possible implementation manner of the first aspect, the determining, by an Ingress PE, that a state of the EVI on a first Egress PE is Active includes: receiving, by the Ingress PE, a second BGP UPDATE message sent by the first Egress PE, where the second BGP UPDATE message indicates a state of a first Ethernet segment (ES); when the state of the first ES is Active, it indicates that the first ES is used to forward the BUM packet; when the state of the first ES is Inactive, it indicates that the first ES is not used to forward the BUM packet; the EVI on the first Egress PE is connected to a second CE by using the first ES; and the EVPN includes the second CE; and when there are multiple first ESs and a state of at least one ES of the first ESs is Active, determining, by the Ingress PE, that the state of the EVI on the first Egress PE is Active.

With reference to the fifth possible implementation manner of the first aspect, in a sixth possible implementation manner of the first aspect, the second BGP UPDATE message is sent to the Ingress PE when the first Egress PE determines that the state of the first ES is Active, the second BGP UPDATE message includes second EVPN NLRI, the second EVPN NLRI includes a second route type field, a second route distinguisher RD field, and an Ethernet signal identifier (ESI) field, content of the second route type field is 1, the second RD field carries an RD of the EVI on the first Egress PE, and when the ESI field carries a first ESI, it indicates that the state of the first ES that is uniquely identified by the first ESI is Active.

With reference to the fifth possible implementation manner of the first aspect, in a seventh possible implementation manner of the first aspect, the second BGP UPDATE message includes second EVPN NLRI, the second EVPN NLRI includes a second route type field, a second route distinguisher RD field, an ESI field, and a second state indication field, content of the second route type field indicates that the second EVPN NLRI carries information about a state of an ES, the second RD field carries an RD of the EVI on the first Egress PE, the ESI field carries a first ESI uniquely identifying the first ES, and when content of the second state indication field is a first value, it is identified that the state of the first ES is Active; and when the content of the second state indication field is a second value, it is identified that the state of the first ES is Inactive.

With reference to the fifth possible implementation manner of the first aspect, in an eighth possible implementation manner of the first aspect, the second BGP UPDATE message includes second EVPN NLRI and a second extended community attribute corresponding to the second EVPN NLRI, the second EVPN NLRI includes a second route distinguisher RD field and an ESI field, the second extended community attribute includes a second type field and a second state indication field, content of the second type field indicates that the second extended community attribute carries information about a state of an ES, the second RD field carries an RD of the EVI on the first Egress PE, the ESI field carries a first ESI uniquely identifying the first ES, when content of the second state indication field is a first value, it is identified that the state of the first ES is Active, and when the content of the second state indication field is a second value, it is identified that the state of the first ES is Inactive.

With reference to the first aspect or any one of the foregoing possible implementation manners of the first aspect, in a ninth possible implementation manner of the first aspect, the method further includes: establishing, by the Ingress PE, a first unicast tunnel to the first Egress PE and a second unicast tunnel to the second Egress PE, where the skipping, by the Ingress PE, forwarding a BUM packet to the second Egress PE includes: blocking, by the Ingress PE, the second unicast tunnel; and the forwarding, by the Ingress PE, the BUM packet to the first Egress PE includes: forwarding, by the Ingress PE, the BUM packet through the first unicast tunnel.

With reference to the ninth possible implementation manner of the first aspect, in a tenth possible implementation manner of the first aspect, after the forwarding, by the Ingress PE, the BUM packet through the first unicast tunnel, the method further includes: detecting, by the Ingress PE, the first unicast tunnel; if it is detected that a transmission fault occurs on the first unicast tunnel, unblocking the second unicast tunnel; and forwarding the BUM packet through the second unicast tunnel.

With reference to the first aspect or any one of the foregoing possible implementation manners of the first aspect, in an eleventh possible implementation manner of the first aspect, the method further includes: establishing, by the Ingress PE, a third unicast tunnel to the first Egress PE, where the skipping, by the Ingress PE, forwarding a BUM packet to the second Egress PE includes: skipping, by the Ingress PE, establishing a fourth unicast tunnel to the second Egress PE; and the forwarding, by the Ingress PE, the BUM packet to the first Egress PE includes: forwarding, by the Ingress PE, the BUM packet through the third unicast tunnel.

With reference to the eleventh possible implementation manner of the first aspect, in a twelfth possible implementation manner of the first aspect, after the forwarding, by the Ingress PE, the BUM packet through the third unicast tunnel, the method further includes: detecting, by the Ingress PE, the third unicast tunnel; if it is detected that a transmission fault occurs on the third unicast tunnel, establishing the fourth unicast tunnel to the second Egress PE; and forwarding the BUM packet through the fourth unicast tunnel.

According to a second aspect, a packet forwarding apparatus is provided, including: a state determining module, configured to determine a state of an EVI on a first Egress PE and a state of the EVI on a second Egress PE, where an EVPN corresponding to the EVI includes a first CE; and a packet forwarding module, configured to: when the state determining module determines that the state of the EVI on the first Egress PE is Active and the state of the EVI on the second Egress PE is Inactive, skip forwarding a broadcast, unknown unicast, and multicast (BUM) packet to the second Egress PE, where the BUM packet is from the first CE; and forward the BUM packet to the first Egress PE.

In a first possible implementation manner of the second aspect, the state determining module includes: a first receiving unit, configured to receive a first BGP UPDATE message sent by the first Egress PE, where the first BGP UPDATE message indicates that the state of the EVI on the first Egress PE is Active; and a first determining unit, configured to determine, according to the first BGP UPDATE message received by the first receiving unit, that the state of the EVI on the first Egress PE is Active.

In a second possible implementation manner of the second aspect, the state determining module includes: a second receiving unit, configured to receive a second BGP UPDATE message sent by the first Egress PE, where the second BGP UPDATE message indicates a state of a first Ethernet segment ES; when the state of the first ES is Active, it indicates that the first ES is used to forward the BUM packet; when the state of the first ES is Inactive, it indicates that the first ES is not used to forward the BUM packet; the EVI on the first Egress PE is connected to a second CE by using the first ES; and the EVPN includes the second CE; and a second determining unit, configured to: when there are multiple first ESs and a state of at least one ES of the first ESs is Active, determine, according to the second BGP UPDATE message received by the second receiving unit, that the state of the EVI on the first Egress PE is Active.

With reference to the first possible implementation manner of the second aspect, in a third possible implementation manner of the second aspect, the first receiving unit is further configured to receive a first BGP UPDATE message sent by the second Egress PE, where the first BGP UPDATE message sent by the second Egress PE indicates that the state of the EVI on the second Egress PE is Inactive; and the first determining unit is further configured to determine, according to the first BGP UPDATE message that is received by the first receiving unit and is sent by the second Egress PE, that the state of the EVI on the second Egress PE is Inactive.

With reference to the second possible implementation manner of the second aspect, in a fourth possible implementation manner of the second aspect, the second receiving unit is further configured to receive a second BGP UPDATE message sent by the second Egress PE, where the second BGP UPDATE message sent by the second Egress PE indicates a state of a second Ethernet segment ES. When the state of the second ES is Active, it indicates that the second ES is used to forward the BUM packet. When the state of the second ES is Inactive, it indicates that the second ES is not used to forward the BUM packet; and the EVI on the second Egress PE is connected to the second CE by using the second ES; and the second determining unit is further configured to: when there are multiple second ESs and a state of each second ES is Inactive, determine, according to the second BGP UPDATE message that is sent by the second Egress PE and received by the second receiving unit, that the state of the EVI on the second Egress PE is Inactive.

With reference to the second aspect or any one of the foregoing possible implementation manners of the second aspect, in a fifth possible implementation manner of the second aspect, the packet forwarding module includes: a first tunnel establishing module, configured to establish a first unicast tunnel to the first Egress PE and a second unicast tunnel to the second Egress PE; and a first sending module, configured to block the second unicast tunnel established by the first tunnel establishing module, and forward the BUM packet through the first unicast tunnel established by the first tunnel establishing module.

With reference to the fifth possible implementation manner of the second aspect, in a sixth possible implementation manner of the second aspect, the apparatus further includes: a first detection module, configured to detect the first unicast tunnel established by the first tunnel establishing module; if it is detected that a transmission fault occurs on the first unicast tunnel, unblock the second unicast tunnel; and trigger the first sending module to forward the BUM packet through the second unicast tunnel.

With reference to the second aspect, or the first, the second, the third, or the fourth possible implementation manner of the second aspect, in a seventh possible implementation manner of the second aspect, the packet forwarding module includes: a second tunnel establishing module, configured to establish a third unicast tunnel to the first Egress PE, and skip establishing a fourth unicast tunnel to the second Egress PE; and a second sending module, configured to forward the BUM packet through the third unicast tunnel.

With reference to the seventh possible implementation manner of the second aspect, in an eighth possible implementation manner of the second aspect, the apparatus further includes: a second detection module, configured to detect the third unicast tunnel established by the second tunnel establishing module; and if it is detected that a transmission fault occurs on the third unicast tunnel, trigger the second tunnel establishing module to establish the fourth unicast tunnel to the second Egress PE, where the second sending module is further configured to forward the BUM packet through the fourth unicast tunnel.

According to a third aspect, a packet forwarding apparatus is further provided, including: a generating module, configured to generate a BGP UPDATE message, where the BGP UPDATE message indicates that a state of an Ethernet virtual private network instance EVI on the apparatus is Active or Inactive; and a sending module, configured to send the BGP UPDATE message generated by the generating module to an Ingress PE.

According to a fourth aspect, a packet forwarding apparatus is further provided, including: a generating module, configured to generate a BGP UPDATE message, where the BGP UPDATE message indicates a state of an Ethernet segment ES; when the state of the ES is Active, it indicates that the ES is used to forward a BUM packet; when the state of the ES is Inactive, it indicates that the ES is not used to forward the BUM packet; an EVI on the apparatus is connected to a CE by using the ES; and an EVPN corresponding to the EVI includes the CE; and a sending module, configured to send the BGP UPDATE message generated by the generating module to an Ingress PE.

According to a fifth aspect, a packet forwarding system is further provided, including an Ingress PE, a first egress Egress PE, and a second Egress PE that are in an EVI, where the Ingress PE determines that a state of the EVI on the first Egress PE is Active, where an EVPN corresponding to the EVI includes a first CE; the Ingress PE is further configured to determine that a state of an EVI on the second Egress PE is Inactive; skip forwarding a BUM packet to the second Egress PE, where the BUM packet is from the first CE; and forward the BUM packet to the first Egress PE.

In a first possible implementation manner of the fifth aspect, the first Egress PE is configured to generate a first BGP UPDATE message, where the first BGP UPDATE message indicates that the state of the EVI on the first Egress PE is Active; and send the first BGP UPDATE message to the Ingress PE; and the Ingress PE is configured to determine, according to the first BGP UPDATE message, that the state of the EVI on the first Egress PE is Active.

In a second possible implementation manner of the fifth aspect, the first Egress PE is configured to generate a second BGP UPDATE message, where the second BGP UPDATE message indicates a state of a first Ethernet segment ES; when the state of the first ES is Active, it indicates that the first ES is used to forward the BUM packet; when the state of the first ES is Inactive, it indicates that the first ES is not used to forward the BUM packet; the EVI on the first Egress PE is connected to a second CE by using the first ES; and the EVPN includes the second CE; and the first Egress PE is further configured to send the second BGP UPDATE message to the Ingress PE; and when there are multiple first ESs and a state of at least one ES of the first ESs is Active, the Ingress PE is configured to determine, according to the received second BGP UPDATE message, that the state of the EVI on the first Egress PE is Active.

With reference to the fifth aspect, the first possible implementation manner of the fifth aspect, or the second possible implementation manner of the fifth aspect, in a third possible implementation manner of the fifth aspect, the second Egress PE is configured to generate a first BGP UPDATE message, where the first BGP UPDATE message generated by the second Egress PE indicates that the state of the EVI on the second Egress PE is Inactive; and send the first BGP UPDATE message generated by the second Egress PE to the Ingress PE; and the Ingress PE is configured to determine, according to the first BGP UPDATE message sent by the second Egress PE, that the state of the EVI on the second Egress PE is Inactive.

With reference to the fifth aspect, the first possible implementation manner of the fifth aspect, or the second possible implementation manner of the fifth aspect, in a fourth possible implementation manner of the fifth aspect, the second Egress PE is configured to generate a second BGP UPDATE message, where the second BGP UPDATE message generated by the second Egress PE indicates a state of a second ES; when the state of the second ES is Active, it indicates that the second ES is used to forward the BUM packet; when the state of the second ES is Inactive, it indicates that the second ES is not used to forward the BUM packet; the EVI on the second Egress PE is connected to the second CE by using the second ES; and the EVPN includes the second CE; and the second Egress PE is further configured to send the second BGP UPDATE message generated by the second Egress PE to the Ingress PE; and when there are multiple second ESs and a state of each second ES is Inactive, the Ingress PE is configured to determine, according to the received second BGP UPDATE message sent by the second Egress PE, that the state of the EVI on the second Egress PE is Inactive.

According to the packet forwarding method provided in the embodiments of the present application, an Ingress PE in an EVI determines that a state of the EVI on a first Egress PE is Active, and determines that a state of the EVI on a second Egress PE is Inactive; the Ingress PE skips forwarding a BUM packet to the second Egress PE, which can reduce repeated BUM traffic that is transmitted in a bearer network and is not finally sent to a remote site; therefore, a waste of bandwidth in the bearer network in the prior art is reduced.

The packet forwarding apparatus that is provided in the embodiments of the present application and is disposed in an Ingress PE in an EVI determines states of EVIs on at least two Egress PEs, forwards a BUM packet to an Egress PE for which a state of the EVI is Active, and skips forwarding the BUM packet to an Egress PE for which a state of the EVI is Inactive, which differs from the prior art in which an Ingress PE forwards a BUM packet to each Egress PE; therefore, repeated BUM traffic transmitted in a bearer network is reduced, and network transmission resources are reduced.

The packet forwarding apparatus that is provided in the embodiments of the present application and is disposed in an Egress PE in an EVI generates a first BGP UPDATE message indicating that a state of the EVI on the Egress PE is Active, and sends the first BGP UPDATE message to an Ingress PE in the EVI; or generates a second BGP UPDATE message indicating a state of a first ES, and sends the second BGP UPDATE message to an Ingress PE in the EVI. Therefore, the Ingress PE can determine states of EVIs on at least two Egress PEs according to the first BGP UPDATE message or the second BGP UPDATE message, forward a BUM packet to an Egress PE for which a state of an EVI is Active, and skip forwarding the BUM packet to an Egress PE for which a state of an EVI is Inactive, which differs from the prior art in which an Ingress PE forwards a BUM packet to each Egress PE. Therefore, reduction in repeated BUM packets transmitted in a bearer network is facilitated, and network transmission resources are reduced.

An Egress PE in the packet forwarding system provided in the embodiments of the present application generates a first BGP UPDATE message indicating that a state of an EVI on the Egress PE is Active or Inactive, and sends the first BGP UPDATE message to an Ingress PE in the EVI; or generates a second BGP UPDATE message indicating a state of an ES, and sends the second BGP UPDATE message to an Ingress PE in an EVI. Therefore, the Ingress PE can determine states of EVIs on at least two Egress PEs according to the first BGP UPDATE message or the second BGP UPDATE message, forward a BUM packet to an Egress PE for which a state of an EVI is Active, and skip forwarding the BUM packet to an Egress PE for which a state of an EVI is Inactive, which differs from the prior art in which an Ingress PE forwards a BUM packet to each Egress PE. Therefore, repeated BUM packets transmitted in a bearer network can be reduced, and network transmission resources can be saved.

BRIEF DESCRIPTION OF DRAWINGS

To describe the technical solutions in the embodiments of the present application more clearly, the following briefly introduces the accompanying drawings required for describing the embodiments. Apparently, the accompanying drawings in the following description show some embodiments of the present application, and a person of ordinary skill in the art may still derive other drawings from these accompanying drawings without creative efforts.

FIG. 5 is a flowchart of a second manner for determining, by an Ingress PE, a state of an EVI on an Egress PE device according to an embodiment of the present application;

FIG. 6a is a schematic diagram of a format of a second BGP UPDATE message in Example 4 according to an embodiment of the present application;

FIG. 6b is a schematic diagram of a format of a second BGP UPDATE message in Example 5 according to an embodiment of the present application;

DESCRIPTION OF EMBODIMENTS

Figure 1:
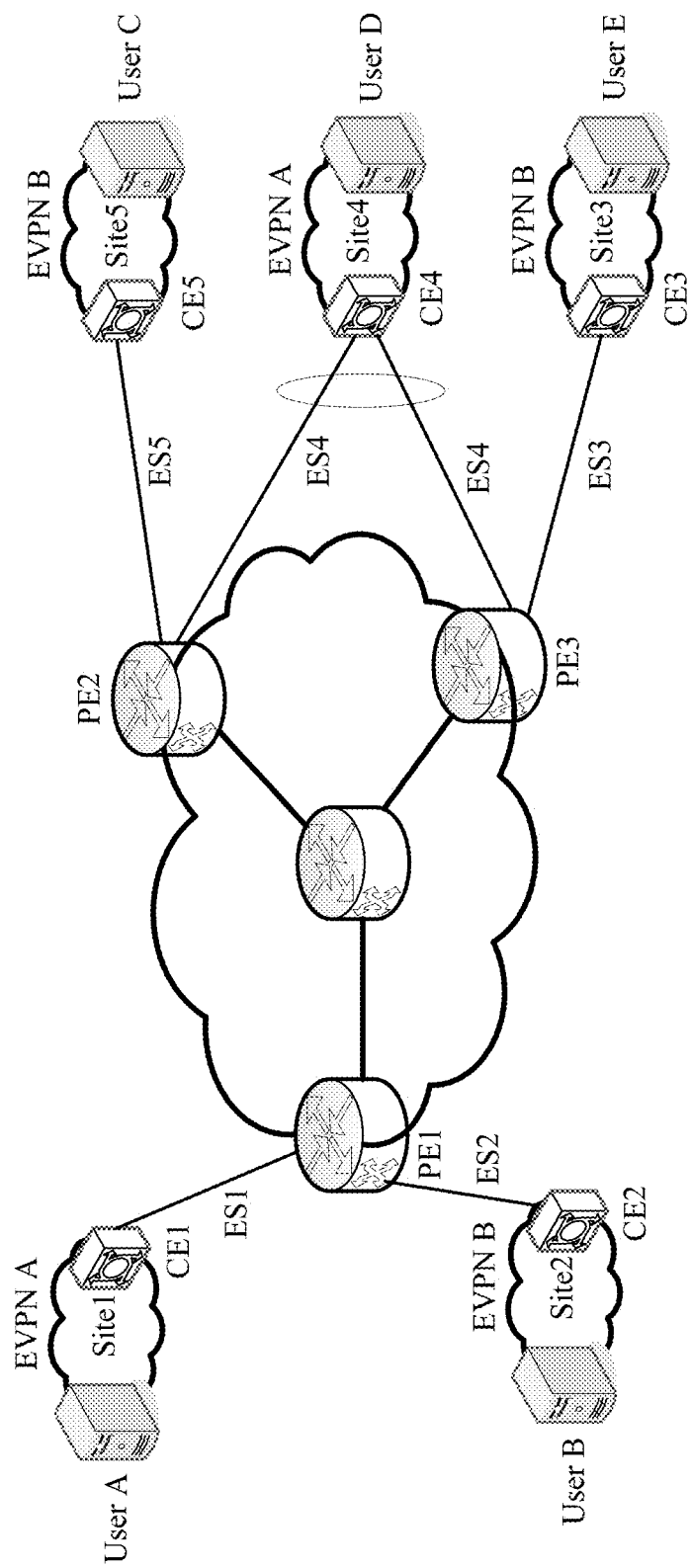
FIG. 1 is a schematic structural diagram of an EVPN according to the present application.

In order to ensure reliability of packet transmission in an EVPN, a multihoming phenomenon usually occurs during networking, that is, in one EVPN, one CE is connected to a bearer network via two or more PEs. If one of the PEs is faulty, a packet of a customer site may be further sent to the bearer network via another PE, which avoids interruption of a user service. FIG. 1 shows a multihoming (dual-homing) instance in which a CE 4 accesses the bearer network via a PE 2 and a PE 3 separately. However, the inventor finds that the multihoming phenomenon also causes a problem of waste of bandwidth resources in a BUM packet forwarding process.

In an existing ingress replication solution, in order to avoid that a CE receives a repeated BUM packet, in a multihoming scenario, a designated forwarder (DF) election mechanism is used to ensure that only a PE serving as a DF forwards a BUM packet to the CE, and a BUM packet that is sent by an Ingress PE to a PE that is not a DF cannot be forwarded to the CE. Assuming in the foregoing instance in FIG. 1 that the PE 2 is a DF, only the PE 2 sends, to the CE 4, a BUM packet that is sent by the PE 1, and the PE 3 cannot send, to the CE 4, a BUM packet that is sent by the PE 1. That is, a BUM packet that is sent by the PE 1 to the PE 3 is blocked on an interface of the PE 3, where the interface of the PE 3 is connected to the CE 4. It can be seen that the packet that is sent by the PE 1 to the PE 3 wastes network bandwidth.

In order to reduce the waste of network bandwidth in the multihoming scenario in the BUM packet forwarding process, embodiments of the present application provide a packet forwarding method. A main implementation principle and specific implementation manners that are in technical solutions of the embodiments of the present application, and advantageous effects that can be correspondingly achieved by the present application are described below in detail with reference to the accompanying drawings.

Figure 2:
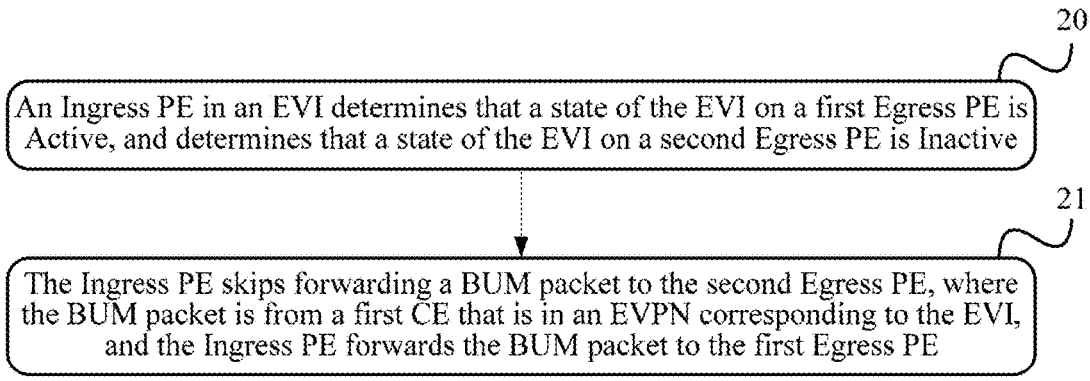
FIG. 2 is a flowchart of a packet forwarding method according to an embodiment of the present application.

First, in an embodiment, with reference to FIG. 2, a packet forwarding method provided in this embodiment of the present application is described from a perspective of an Ingress PE. The packet forwarding method is used to forward a BUM packet in an EVPN.

As shown in FIG. 2, a process of the packet forwarding method provided in the embodiment of the present application is as follows:

Step 20: An Ingress PE in an EVI determines a state of the EVI on at least two Egress PEs, where the state of the EVI includes Active and Inactive. When the state of the EVI is Active, it indicates that an ES in the EVI can be used to forward a BUM packet, and when the state of the EVI is Inactive, it indicates that no ES in the EVI can be used to forward the BUM packet. For example, the Ingress PE determines that a state of the EVI on a first Egress PE is Active, and determines that a state of the EVI on a second Egress PE is Inactive.

It should be noted that, an order in which the Ingress PE determines the state of the EVI on the at least two Egress PEs is not limited. The state of the EVI on the first Egress PE may be determined first, or the state of the EVI on the second Egress PE may be determined first, or the states of the EVIs on multiple Egress PEs may be determined concurrently.

Step 21: The Ingress PE skips forwarding a BUM packet to the second Egress PE, where the BUM packet is from a first CE, where the first CE is in an EVPN corresponding to the EVI and is connected to the Ingress PE, and the Ingress PE forwards the BUM packet to the first Egress PE.

In the embodiment of the present application, an Ingress PE sending a BUM packet first determines states of EVIs on multiple Egress PEs, sends the BUM packet to an EVI whose state is Active, and skips sending the BUM packet to an EVI whose state is Inactive. This reduces repeated BUM traffic that is transmitted in a bearer network and is not finally sent to a remote site (that is, saves BUM packets sent by the Ingress PE to a second Egress PE); therefore, a waste of bandwidth in the bearer network in the related art is reduced.

Optionally, in step 20 in FIG. 2, manners for determining a state of an EVI on an egress PE device by an ingress PE include, but are not limited to, the following:

Manner 1: The Ingress PE device receives a Border Gateway Protocol update (BGP UPDATE) message sent by the Egress PE device, where the BGP UPDATE message indicates that a state of the EVI on the Egress PE device is Active, and the Ingress PE determines, according to the BGP UPDATE message, that the state of the EVI on the first Egress PE is Active. In order to distinguish from another BGP UPDATE message in another embodiment, in this application, the BGP UPDATE message that is sent by the Egress PE device and is used to indicate the state of the EVI on the Egress PE device is referred to as a first BGP UPDATE message.

During network planning, for a scenario in which a multihoming phenomenon of a CE device occurs, that is, a scenario in which a same CE device accesses a bearer network via two or more PE devices in an EVPN corresponding to one EVI, a state of the EVI on one of two or more PE devices is set to Active, and a state of the EVI on other PE device is set to Inactive. In this case, the Egress PE device may read a preset state of the EVI on the Egress PE device from locally stored configuration information.

In addition, the Egress PE device may also determine the state of the EVI on the Egress PE device through a dynamic calculation method. Refer to a schematic diagram shown in FIG. 3.

Step S31: An Egress PE device reads a state of each ES in an EVI on the Egress PE device from locally stored configuration information, where the state of the ES is Active or Inactive. When the state of the ES is Active, it indicates that the ES is used to forward BUM traffic, and when the state of the ES is Inactive, it indicates that the ES is not used to forward the BUM traffic.

Step S32: The Egress PE device determines a state of the EVI on the Egress PE device according to the state of each ES in the EVI on the Egress PE device. Specifically, if the state of each ES in the EVI on the Egress PE device is Inactive, the Egress PE device determines that the state of the EVI on the Egress PE device is Inactive. If information about the state of at least one ES in the EVI on the Egress PE device is Active, the Egress PE device determines that the state of the EVI on the Egress PE device is Active. For example, in the multihoming instance in FIG. 1, only one ES (ES 4) exists in an EVI corresponding to an EVPN A on the PE 2, a state of the ES 4 read by the PE 2 is Inactive, and the PE 2 determines that a state of the EVI corresponding to the EVPN A on the PE 2 is Inactive. Assuming that multiple ESs (it is assumed that the multiple ESs are three ESs: the ES 4, an ES 41, and an ES 42) in the EVI corresponding to the EVPN A on the PE 2, only when a state corresponding to each of the ES 4, the ES 41, and the ES 42 is Inactive, can it be determined that the state of the EVI corresponding to the EVPN A on the PE 2 is Inactive. Only one ES (ES 4) exists in an EVI corresponding to an EVPN A on a PE 3. Information about a state, which is read by the PE 3, of the ES 4 is Active, and the PE 3 determines that the state of the EVI corresponding to the EVPN A on the PE 3 is Active. Assuming that multiple ESs (it is assumed that the multiple ESs are three ESs: the ES 4, an ES 43, and an ES 44) in the EVI corresponding to the EVPN A on the PE 3, as long as one of states corresponding to the ES 4, the ES 43, and the ES 44 is Active, it can be determined that the state of the EVI corresponding to the EVPN A on the PE 3 is Active.

Optionally, a state of an ES in one EVI in local configuration information of the Egress PE device is calculated by using a predetermined election algorithm, and the election algorithm is used to ensure that a state of only one ES in all ESs connected to a multihomed CE device is Active. In one EVI, all PE devices calculate states of ESs on the PE devices by using an identical election algorithm. That is, in the EVPN A, the PE 2 and the PE 3 calculate, by using the identical election algorithm, a state of an ES connected to the CE 4.

After determining the state of the EVI on the Egress PE device, the Egress PE device generates a first BGP UPDATE message, where the first BGP UPDATE message is used to indicate that the state of the EVI on the Egress PE is Active, and sends the first BGP UPDATE message to the Ingress PE.

Specifically, when the state of the EVI on the Egress PE device is indicated by using the first BGP UPDATE message, implementation may be performed by using an existing field or by using an extension field. A specific implementation manner includes, but is not limited to, the following three examples:

Example 1

Figure 4A:
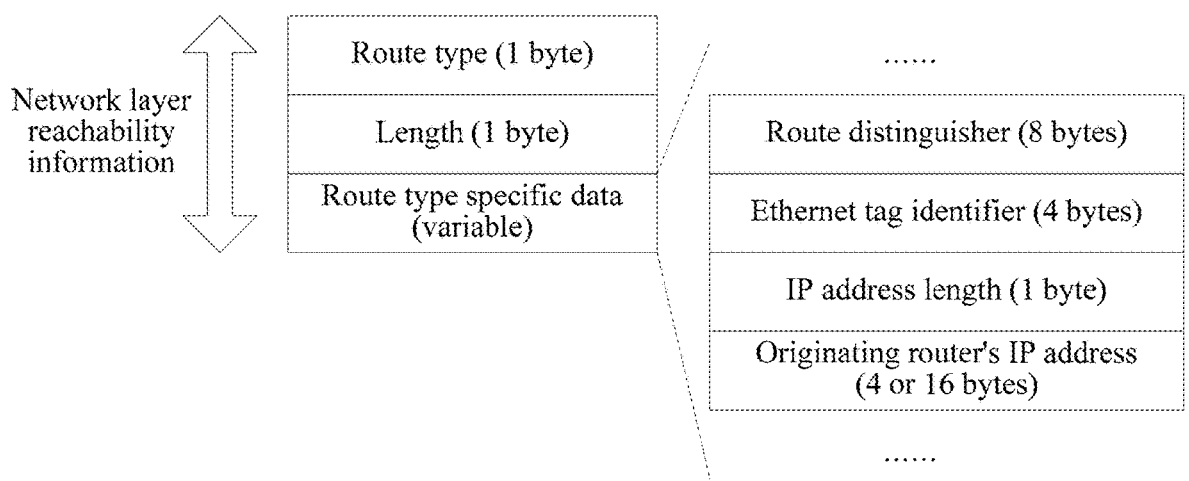
FIG. 4a is a schematic diagram of a format of a first BGP UPDATE message in Example 1 according to an embodiment of the present application.

The first BGP UPDATE message is sent to the Ingress PE when the Egress PE determines that the state of the EVI on the Egress PE is Active. In this example, a format of the first BGP UPDATE message is shown in FIG. 4a. The first BGP UPDATE message includes a first EVPN NLRI, the first EVPN NLRI includes a first route type (Route Type) field (a "route type" field in FIG. 4a) and a first RD field (a "route distinguisher" field in FIG. 4a), content of the first route type field is 3 (that is, it indicates that the EVPN NLRI is a message object of an Inclusive Multicast Ethernet Tag Route type, and the content of the first route type field includes an EVI), and the first RD field carries an RD of the EVI on the first Egress PE.

The first RD field is carried in a set of data structures in a fixed format in a route type specific (Route Type specific) field in FIG. 4a, and the data structures further include an Ethernet tag identifier (Ethernet Tag ID) field, an IP address length (IP Address Length) field, and an originating router's IP address (Originating Router's IP Addr) field.

If the Ingress PE receives the first BGP UPDATE message in this example, it is determined that the state of the EVI on the Egress PE sending the first BGP UPDATE message is Active. In this example, it is equivalent to extend, based on a route advertisement function of the existing EVPN NLRI of an Inclusive Multicast Ethernet Tag Route type, a new function used to indicate a state of an EVI on an Egress PE. For example, in a scenario in which there are two Egress PEs, if the Ingress PE only receives the first BGP UPDATE message sent by the first Egress PE, it is determined that a state of the EVI on the first Egress PE is Active.

The manner, provided in this instance, for indicating a state of an EVI on an Egress PE device by a first BGP UPDATE message makes a low requirement on the Egress PE, and can be implemented without a function of supporting an extended BGP UPDATE message. Therefore, the implementation difficulty is relatively low.

Example 2

Figure 4B:
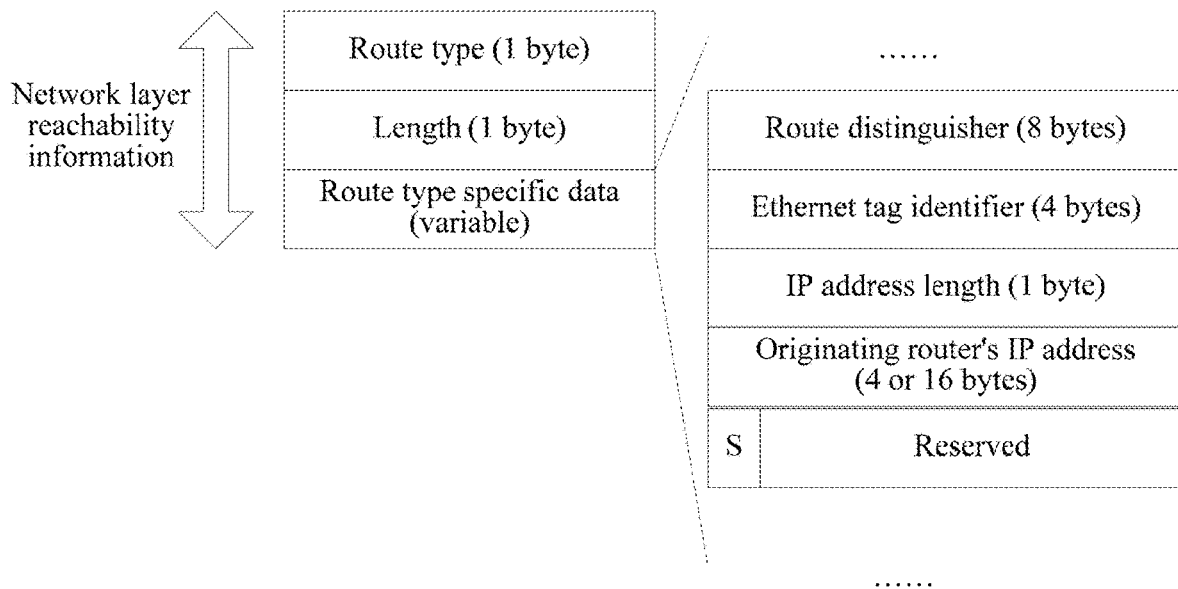
FIG. 4b is a schematic diagram of a format of a first BGP UPDATE message in Example 2 according to an embodiment of the present application.

In this example, a format of the first BGP UPDATE message is shown in FIG. 4b. The first BGP UPDATE message includes first EVPN network layer reachability information NLRI, the first EVPN NLRI includes a first route type (Route Type) field (a "route type" field in FIG. 4b), a first RD field (a "route distinguisher" field in FIG. 4b), and a first state indication field (an "S" field in FIG. 4b), content of the first route type field indicates that the first EVPN NLRI carries information about a state of an EVI, the first RD field carries an RD of the EVI on the first Egress PE, and when content of the first state indication field is a first value, it is identified that a state of the EVI corresponding to the RD is Active. Further, when the content of the first state indication field is a second value, it is identified that the state of the EVI is Inactive. Values of the first value and the second value may be flexibly set according to an actual situation, for example, it is identified by using "0" that the state of the EVI corresponding to the RD is Active, and it is identified by using "1" that the state of the EVI corresponding to the RD is Inactive.

The first RD field is carried in a set of data structures in a fixed format in a route type specific (Route Type specific) field in FIG. 4b, and the data structures further include an Ethernet tag identifier (Ethernet Tag ID) field, an IP address length (IP Address Length) field, an originating router's IP address (Originating Router's IP Addr) field, and a reserved (Reserved) field.

Optionally, content of the first route type field may be specifically another numerical value except a numerical value that is already used in an existing standard, for example, a type of EVPN NLRI is specified in a BGP MPLS Based Ethernet VPN (draft-ietf-12vpn-EVPN-03) standard when content of a route type field is 1, 2, 3, and 4 separately: When the content of the route type field is 1, a corresponding route type is an Ethernet Auto-Discovery (A-D) route; when the content of the route type field is 2, a corresponding route type is a MAC advertisement route; when the content of the route type field is 3, a corresponding route type is an Inclusive Multicast Route; when the content of the route type field is 4, a corresponding route type is an Ethernet Segment Route. Therefore, if the content of the first route type field in this example is indicated by using N, a value range of N is natural numbers except 1, 2, 3, and 4, for example, a value of N in this example is 5. Correspondingly, when receiving the first BGP UPDATE message in this example, when determining, according to the content of the first route type field in the EVPN NLRI, that the first BGP UPDATE message carries the information of the state of the EVI, the Ingress PE may read the RD of the EVI from the RD field according to the field format shown in FIG. 4b, and then determine, according to the value of the content of the first state indication field in the EVPN NLRI, that the state of the EVI is Active or Inactive.

For example, in a scenario in which there are two Egress PEs, it is assumed that the Ingress PE receives a first BGP UPDATE message sent by a first Egress PE and a first BGP UPDATE message sent by a second Egress PE. Content of a first route type field in EVPN NLRI in the first BGP UPDATE message sent by the first Egress PE is 5, which indicates that the EVPN NLRI carries information about a state of an EVI and an RD for which an RD field is an EVI A, and content of a first state indication field in the EVPN NLRI is 0. Therefore, the Ingress PE determines that a state of the EVI A on the first Egress PE is Active. Content of a first route type field in EVPN NLRI in the first BGP UPDATE message sent by the second Egress PE indicates that the first EVPN NLRI carries information about a state of an EVI and an RD for which an RD field is an EVI A, and content of a first state indication field in the EVPN NLRI is 1. Therefore, the Ingress PE determines that a state of the EVI A on the second Egress PE is Inactive.

An existing BGP UPDATE message is extended in the manner, which is provided in this example, for indicating a state of an EVI on an Egress PE by a first BGP UPDATE message, EVPN NLRI of a new route type is provided, a state indication field is newly added to the EVPN NLRI, and content, which is different values, of the state indication field separately identifies that the state of the EVI is Active and Inactive. The Ingress PE receives the first BGP UPDATE message in this example, and may determine, according to the RD and the state indication field that are in the EVPN NLRI of the first BGP UPDATE message, the state of the EVI on the Egress PE sending the first BGP UPDATE message.

Example 3

Figure 4C:
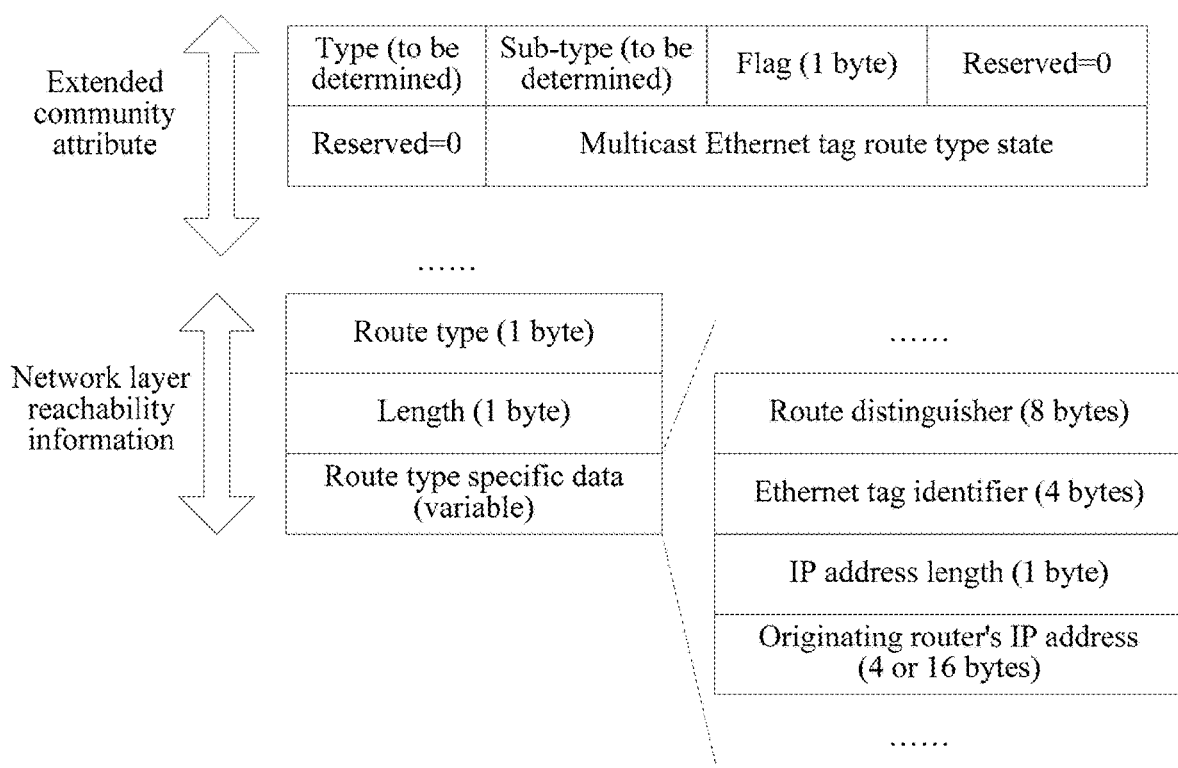
FIG. 4c is a schematic diagram of a format of a first BGP UPDATE message in Example 3 according to an embodiment of the present application.

In this example, a format of the first BGP UPDATE message is shown in FIG. 4c. The first BGP UPDATE message includes a first EVPN NLRI and a first extended community attribute corresponding to the first EVPN NLRI (that is, the first extended community attribute is used to describe an attribute of the first EVPN NLRI and a feature of the first EVPN NLRI). The first EVPN NLRI includes a first RD field (a "route distinguisher" field in FIG. 4c), and the first extended community attribute includes a first type (Type) field (a "type (to be determined)" field in FIG. 4c) and a first state indication field. Content of the first type field indicates that the first extended community attribute carries information about a state of an EVI, the first RD field carries an RD of the EVI on the first Egress PE. When content of the first state indication field is a first value, it is identified that a state of the EVI corresponding to the RD is Active. Further, when the content of the first state indication field is a second value, it is identified that the state of the EVI is Inactive. Values of the first value and the second value may be flexibly set according to an actual situation, for example, it is identified by using "0" that the state of the EVI corresponding to the RD is Active, and it is identified by using "1" that the state of the EVI corresponding to the RD is Inactive.

Optionally, a specific value of content of a type field of the first extended community attribute is similar to the value of the first route type field in the example 2, and may be another numerical value except a numerical value already used in an existing standard.

The first EVPN NLRI further includes a first route type field (a "route type" field in FIG. 4c). In this example, content of the first route type field is 3, which indicates that a type of the EVPN NLRI is an Inclusive Multicast Ethernet Tag Route, where the content of the first route type field carries the RD of the EVI. The first RD field is carried in a set of data structures in a fixed format in a route type specific field in FIG. 4c, and the data structures further include an Ethernet tag identifier (Ethernet Tag ID) field, an IP address length (IP Address Length) field, and an originating router's IP address (Originating Router's IP Addr) field. The extended community attribute further includes a type (Type) field (a "type (to be determined)" field in FIG. 4c), a sub-type (Sub-Type) field (a "sub-type (to be determined)" field in FIG. 4c), a flag (Flags) field (a "flag (1 byte)" field in FIG. 4c), and a reserved (Reserved=0) field (a "Reserved=0" field in FIG. 4c).

For example, in a scenario in which there are two Egress PEs, it is assumed that the Ingress PE receives a first BGP UPDATE message sent by a first Egress PE and a first BGP UPDATE message sent by a second Egress PE. Content of a first type field in a first extended community attribute of the first BGP UPDATE message sent by the first Egress PE indicates that the first extended community attribute of the first BGP UPDATE message carries information about a state of an EVI and an RD for which an RD field is an EVI A, and content of a first state indication field in the extended community attribute is 0; therefore, the Ingress PE determines that a state of the EVI A on the first Egress PE is Active. Content of a first type field in the first extended community attribute of the first BGP UPDATE message sent by the second Egress PE indicates that the first extended community attribute of the first BGP UPDATE message carries state information and the RD for which the RD field is an EVI A, and content of a first state indication field in the extended community attribute is 1; therefore, the Ingress PE determines that a state of the EVI A on the second Egress PE is Inactive.

An existing first BGP UPDATE message is extended in the manner, which is provided in this instance, for indicating a state of an EVI on an Egress PE by a first BGP UPDATE message, content used to describe the first type field in an extended community attribute of the EVPN NLRI indicates that the extended community attribute carries state information, a state indication field is newly added to the extended community attribute, and content, which is different values, of the state indication field separately identifies Active and Inactive. The Ingress PE receives the first BGP UPDATE message in this instance, and may determine, according to the RD in the EVPN NLRI of the first BGP UPDATE message and the state indication field in the extended community attribute, the state of the EVI on the Egress PE sending the first BGP UPDATE message.

Manner 2: As shown in FIG. 5, the packet forwarding method includes:

Step 501: An Ingress PE receives a second BGP UPDATE message sent by an Egress PE, where the second BGP UPDATE message indicates a state of a first ES; when the state of the first ES is Active, it indicates that the first ES is used to forward a BUM packet; when the state of the first ES is Inactive, it indicates that the first ES is not used to forward the BUM packet; an EVI on a first Egress PE is connected to a second CE via the first ES; and an EVPN includes the second CE.

Step 502: The Ingress PE device determines the state of the EVI on the Egress PE device according to the state of the first ES in the EVI on the Egress PE, which includes: when there are multiple first ESs and a state of at least one ES of the first ESs is Active, determining, by the Ingress PE, that a state of the EVI on the first Egress PE is Active. In other words, if a state of each ES in the EVI on the Egress PE is Inactive, the state of the EVI is Inactive; but if a state of at least one ES in the EVI on the Egress PE is Active, the state of the EVI on the Egress PE is Active.

Specifically, for a manner for determining, by each Egress PE device, a state of an ES in the EVI on the Egress PE device, refer to descriptions in Manner 1, and details are not provided herein again. Based on this, the Egress PE generates a second BGP UPDATE message, where the second BGP UPDATE message indicates the state of the first ES, and sends the second BGP UPDATE message to the Ingress PE device.

When the second BGP UPDATE message indicates the state of the first ES, the state of the first ES may be indicated by using an existing field or an extension field, and three specific examples are as follows:

Example 4

The second BGP UPDATE message is sent to the Ingress PE when the first Egress PE determines that the state of the first ES is Active. In this example, a format of the first BGP UPDATE message is shown in FIG. 6*a*. The second BGP UPDATE message includes second EVPN NLRI, the second EVPN NLRI includes a second route type (Route Type) field (a "route type" field in FIG. 6*a*), a second RD field (a "route distinguisher" field in FIG. 6*a*), and an ESI field (an "Ethernet segment identifier" field in FIG. 6*a*), content of the second route type field is 1, the second RD field carries an RD of the EVI on the first Egress PE, and when the ESI field carries a first ESI, it indicates that the state of the first ES that is uniquely identified by the first ESI is Active.

The second RD field is carried in a set of data structures in a fixed format in a route type specific (Route Type specific) field in FIG. 6*a*, and the data structures further include an Ethernet segment identifier (Ethernet Segment Identifier) field (an "Ethernet segment identifier" field in FIG. 6*a*), an Ethernet tag identifier (Ethernet Tag ID) field (an "Ethernet tag identifier" field in FIG. 6*a*), and a multi-protocol label switching label (MPLS Label) field (a "multiprotocol label switching label" field in FIG. 6*a*).

If receiving the second BGP UPDATE message in this instance, the Ingress PE determines the state of the ES in the EVI on the Egress PE sending the second BGP UPDATE message. Then, based on this, the state of the EVI is determined. In this instance, it is equivalent to extend, based on a route advertisement function of the existing EVPN NLRI of an Inclusive Multicast Ethernet Tag Route type, a new function used to indicate the state of the ES in the EVI on the Egress PE.

It is assumed that, in a scenario in which there are two Egress PEs, the Ingress PE is a PE 1, and the Egress PEs are a PE 2 and a PE 3. Assuming that three ESs (which are an ES 4, an ES 41, and an ES42 separately) exist in an EVI corresponding to an EVPN A on the PE 2, the PE 2 determines that a state corresponding to the ES 4 is Active and states corresponding to the ES 41 and the ES 42 are Inactive; in a second BGP UPDATE message generated by the PE 2, content of the route type field in the second BGP UPDATE message is 1, the RD field carries an RD of an EVI corresponding to the EVPN A on the PE 2, and content of the ESI field is "ES 4". The PE 2 sends the generated second BGP UPDATE message to the PE 1. After receiving the second BGP UPDATE message, the PE 1 determines that the state of the ES 4 in the EVI corresponding to the EVPN A on the PE 2 is Active; therefore, it is determined that the state of the EVI corresponding to the EVPN A on the PE 2 is Active.

The manner, which is provided in this example, for indicating a state of an ES in an EVI on an Egress PE device by a first BGP UPDATE message makes a low requirement on the Egress PE, and can be implemented without a function of supporting an extended BGP UPDATE message. Therefore, the implementation difficulty is relatively low.

Example 5

In this example, a format of the second BGP UPDATE message is shown in FIG. 6*b*.

The second BGP UPDATE message includes second EVPN NLRI, the second EVPN NLRI includes a second route type (Route Type) field (a "route type" field in FIG. 6b), a second RD field (a "route distinguisher" field in FIG. 6b), an ESI field (an "Ethernet segment identifier" field in FIG. 6b), and a second state indication field (an "S" field in FIG. 6b). Content of the second route type field indicates that the second EVPN NLRI carries information about a state of an ES, the second RD field carries an RD of the EVI on the first Egress PE, and the ESI field carries a first ESI uniquely identifying the first ES. When content of the second state indication field is a first value, it is identified that a state of the first ES is Active; and when the content of the second state indication field is a second value, it is identified that the state of the first ES is Inactive. Values of the first value and the second value may be flexibly set according to an actual situation, for example, it is identified by using "0" that the state of the EVI corresponding to the RD is Active, and it is identified by using "1" that the state of the EVI corresponding to the RD is Inactive.

The second RD field is carried in a set of data structures in a fixed format in a route type specific (Route Type specific) field in FIG. 6b, and the data structures further include an Ethernet segment identifier (Ethernet Segment Identifier) field (an "Ethernet segment identifier" field in FIG. 6b), an Ethernet tag identifier (Ethernet Tag ID) field (an "Ethernet tag identifier" field in FIG. 6b), and a multi-protocol label switching label (MPLS Label) field (a "multiprotocol label switching label" field in FIG. 6b).

Optionally, content of the second route type field may be specifically another numerical value except a numerical value that is already used in an existing standard, for example, a type of EVPN NLRI is specified in a BGP MPLS Based Ethernet VPN (draft-ietf-12vpn-EVPN-03) standard when content of a route type field is 1, 2, 3, and 4 separately. When the content of the route type field is 1, a corresponding route type is an Ethernet Auto-Discovery (A-D) route. When the content of the route type field is 2, a corresponding route type is a MAC advertisement route. When the content of the route type field is 3, a corresponding route type is an Inclusive Multicast Route. When the content of the route type field is 4, a corresponding route type is an Ethernet Segment Route. Therefore, if the content of the second route type field in this instance is indicated by using M, a value range of M is natural numbers except 1, 2, 3, and 4, for example, a value of M in this instance is 6. Correspondingly, when receiving the second BGP UPDATE message in this instance, when determining, according to content of the second route type field in the EVPN NLRI, that the second BGP UPDATE message carries the information about a state of the ES, according to the format shown in FIG. 6b, the Ingress PE may read the RD of the EVI from the RD field, read the ESI corresponding to the ES from the ESI field, and read a value from the second state indication field, so as to determine the state of the ES in the EVI on the Egress PE; then according to the state of the ES, the Ingress PE determines that the state of the EVI is Active or Inactive.

Figure 6C:
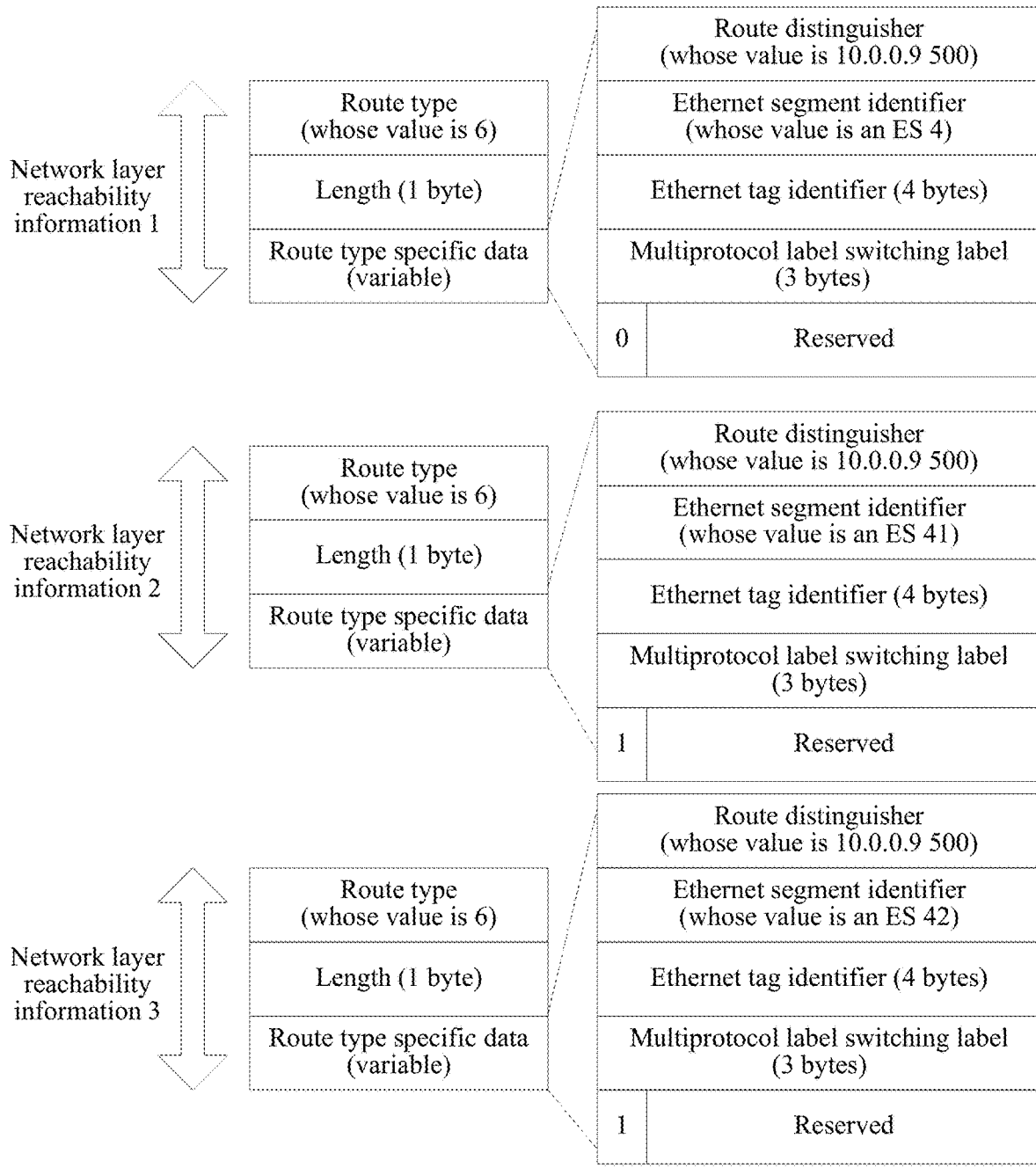
FIG. 6c is a schematic diagram of a format of a second BGP UPDATE message in Example 5 according to an embodiment of the present application.

It is assumed that, in a scenario in which there are two Egress PEs, the Ingress PE is a PE 1, and the Egress PEs are a PE 2 and a PE 3. Assuming that three ESs (which are an ES 4, an ES 41, and an ES42 separately) exist in an EVI corresponding to an EVPN A on the PE 2, the PE 2 determines that a state corresponding to the ES 4 is Active and states corresponding to the ES41 and the ES42 are Inactive. A second BGP UPDATE message generated by the PE 2 is shown in FIG. 6c. The second BGP UPDATE message has three pieces of EVPN NLRI, content of a route type field in each piece of EVPN NLRI is 6, and a Route Type specific field in one piece of EVPN NLRI includes a set of data, which is used to describe one ES and a corresponding state. An RD field in a first piece of EVPN NLRI carries an RD of the EVI corresponding to the EVPN A on the PE 2, for example, "10.0.0.9 500", content of an ESI field is "ES 4", and content of a second state indication field is 0. An RD field in a second piece of EVPN NLRI carries an RD of the EVI corresponding to the EVPN A on the PE 2, content of the ESI field is "ES 41", and the content of the state indication field is 1. An RD field in a third piece of EVPN NLRI carries an RD of the EVI corresponding to the EVPN A on the PE 2, the content of the ESI field is "ES 42", and the content of the second state indication field is 1. It can be understood by a person skilled in the art that, when there is only one ES in the EVI on the Egress PE, the second BGP UPDATE message may include only one piece of EVPN NLRI; when there are multiple ESs in the EVI on the Egress PE, the second BGP UPDATE message may include multiple pieces of EVPN NLRI, and a quantity of included EVPN NLRI is the same as a quantity of ESs. After receiving the second BGP UPDATE message sent by the PE 2, the PE 1 determines that the state of the ES 4 in the EVI corresponding to the EVPN A on the PE 2 is Active; therefore, it is determined that the state of the EVI corresponding to the EVPN A on the PE 2 is Active.

Figure 6D:
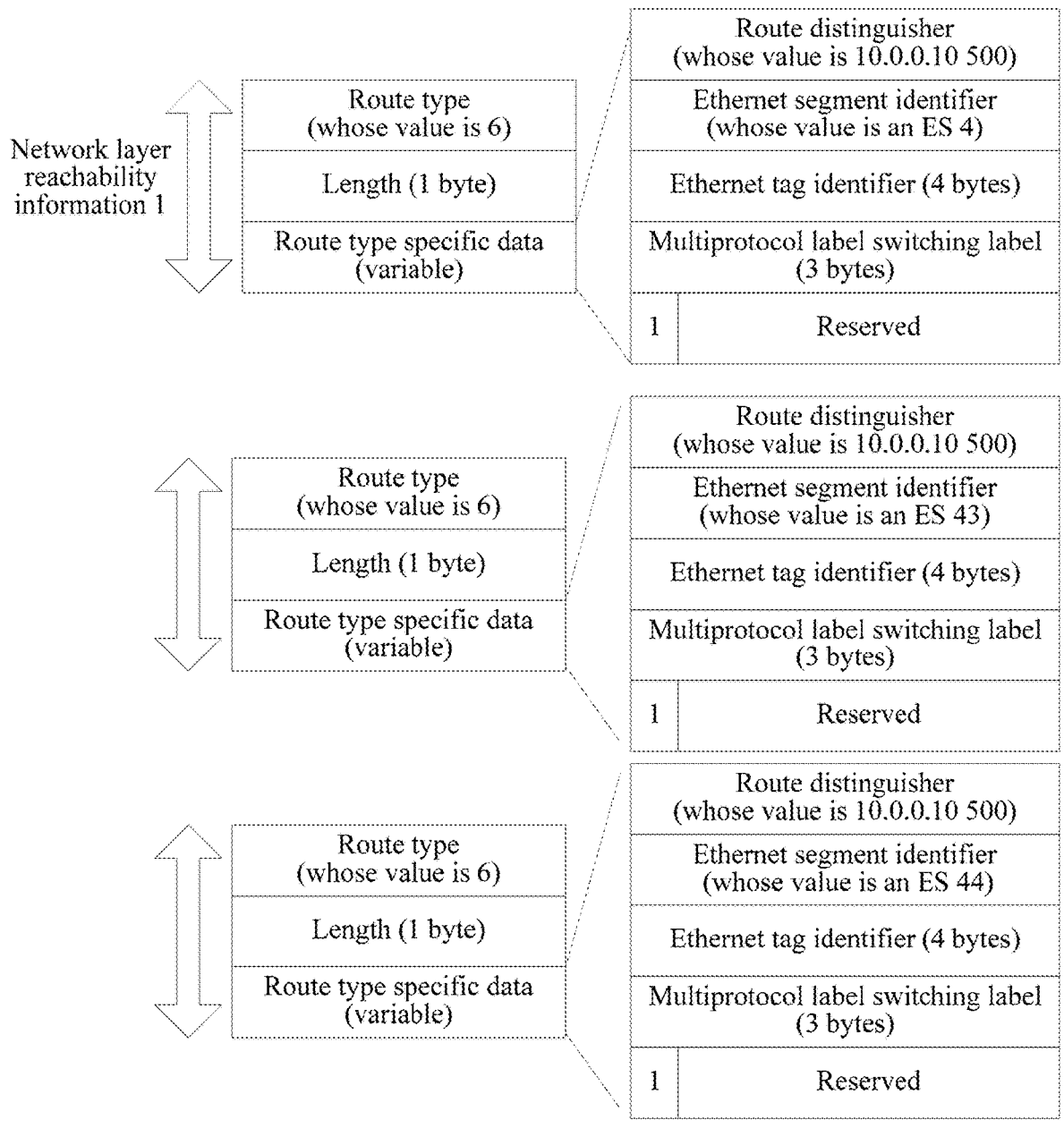
FIG. 6d is a schematic diagram of a format of a second BGP UPDATE message in Example 5 according to an embodiment of the present application.

Assuming that three ESs (which are an ES 4, an ES 43, and an ES 44 separately) exist in the EVI corresponding to the EVPN A on the PE 3, the PE 3 determines that a state corresponding to each of the ES 4, the ES 43, and the ES 44 is Inactive. A second BGP UPDATE message generated by the PE 3 is shown in FIG. 6d, where the second BGP UPDATE message has three pieces of EVPN NLRI, and content of a route type field in each piece of EVPN NLRI is 6. An RD field in a Route Type specific field in a first piece of EVPN NLRI carries an RD of the EVI corresponding to the EVPN A on the PE 3, for example, "10.0.0.9 500", content of an ESI field is "ES 4", and content of the second state indication field is 1. An RD field in a second piece of EVPN NLRI carries an RD of the EVI corresponding to the EVPN A on the PE 3, the content of the ESI field is "ES 43", and the content of the second state indication field is 1. The RD field in a third piece of EVPN NLRI carries an RD of the EVI corresponding to the EVPN A on the PE 3, the content of the ESI field is "ES 44", and the content of the second state indication field is 1. After receiving the second BGP UPDATE message sent by the PE 3, the PE 1 determines that the state of each of the ES 4, the ES 43, and the ES 44 in the EVI corresponding to the EVPN A on the PE 3 is Inactive; therefore, it is determined that the state of the EVI corresponding to the EVPN A on the PE 3 is Inactive.

An existing BGP UPDATE message is extended by using the manner, which is provided in this example, for indicating a state of an ES by a second BGP UPDATE message, EVPN NLRI of a new route type is provided, a state indication field is newly added to the EVPN NLRI, and content, which is different values, of the state indication field separately indicates that the state of the ES is Active and Inactive. The Ingress PE receives the second BGP UPDATE message in this instance, and may determine, according to the RD field, the ESI field, and the state indication field that are in the EVPN NLRI of the second BGP UPDATE message, the state of the ES in the EVI on the Egress PE sending the second BGP UPDATE message, so that the state of the EVI on the Egress PE is further determined.

Example 6

Figure 6E:
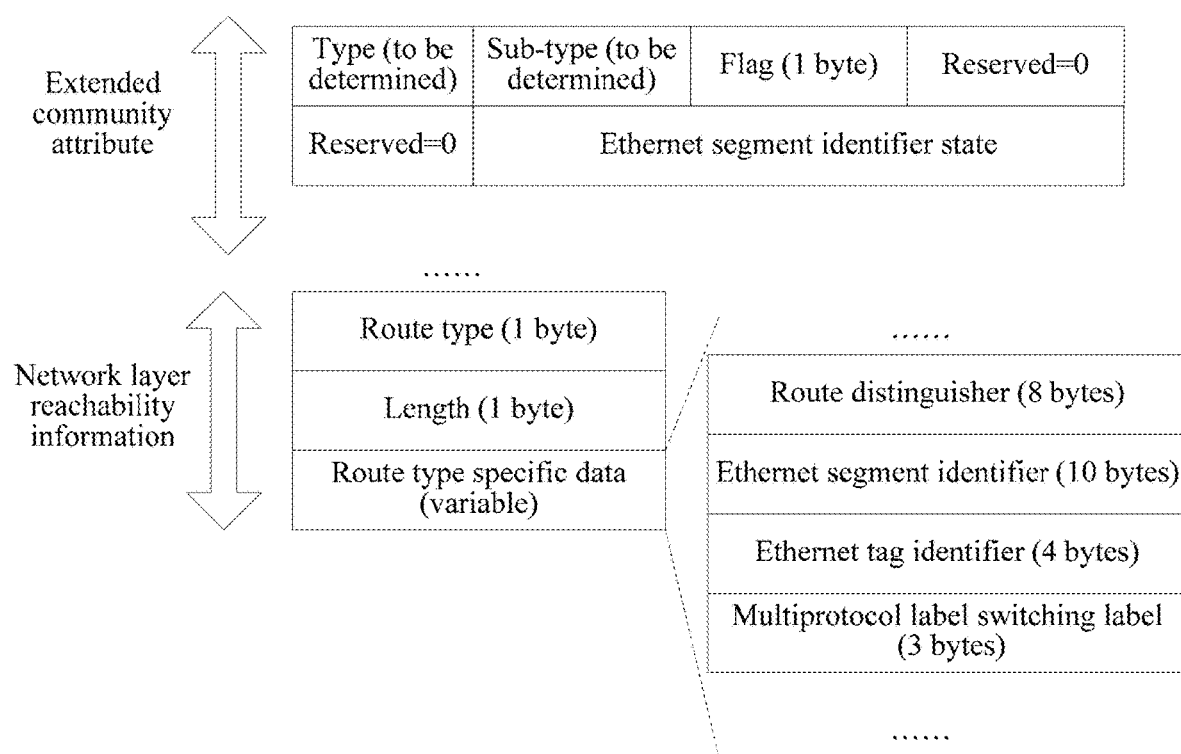
FIG. 6e is a schematic diagram of a format of a second BGP UPDATE message in Example 6 according to an embodiment of the present application.

In this example, a format of the second BGP UPDATE message is shown in FIG. 6e. The second BGP UPDATE message includes second EVPN NLRI and a second extended community attribute corresponding to the second EVPN NLRI. The second EVPN NLRI includes an RD field (a "route distinguisher" field in FIG. 6e) and an ESI field (an "Ethernet segment identifier" field in FIG. 6e). The second extended community attribute includes a second type (Type) field (a "type (to be determined)" field in FIG. 6e) and a second state indication field. Content of the second type field indicates that the second extended community attribute carries information about a state of an ES, the second RD field carries an RD of the EVI on the first Egress PE, the ESI field carries a first ESI uniquely identifying the first ES, when content of the second state indication field is a first value, it is identified that the state of the first ES is Active, and when the content of the second state indication field is a second value, it is identified that the state of the first ES is Inactive. Values of the first value and the second value may be flexibly set according to an actual situation, for example, it is identified by using "0" that the state of the first ES is Active, and it is identified by using "1" that the state of the first ES is Inactive.

Figure 6F:
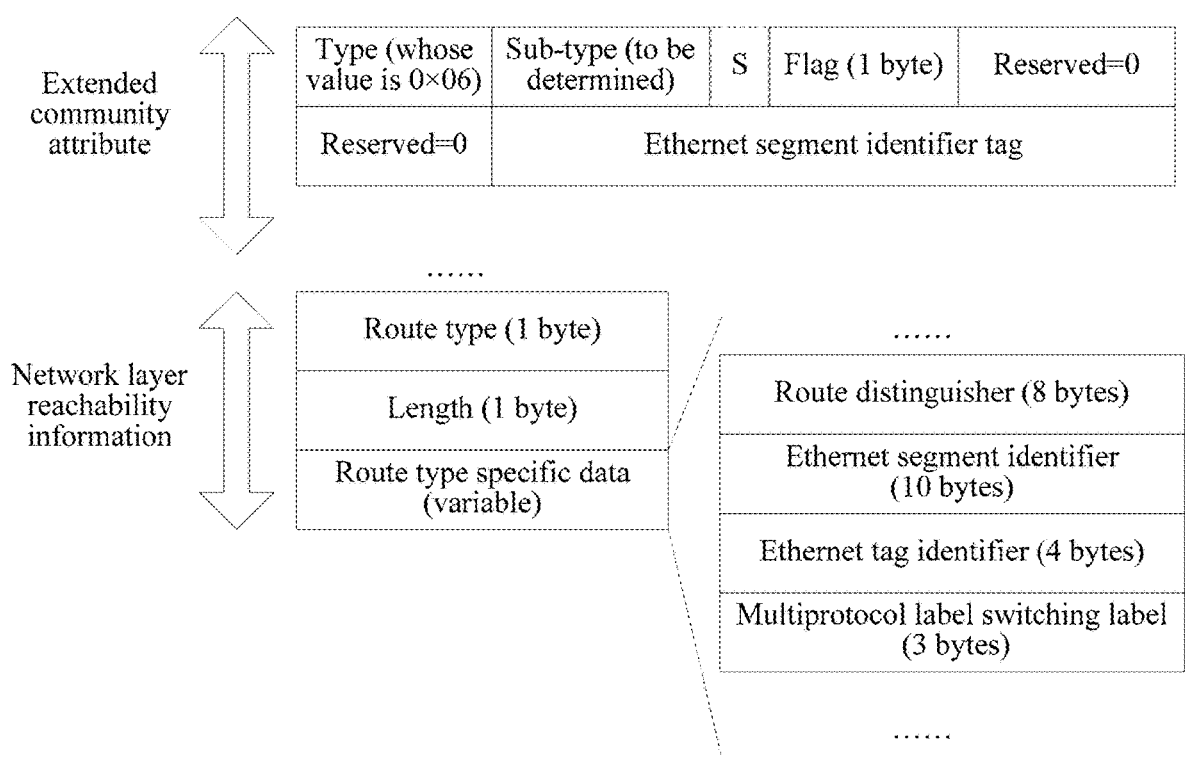
FIG. 6f is a schematic diagram of a format of a second BGP UPDATE message in Example 6 according to an embodiment of the present application.

Optionally, the second extended community attribute may be a newly added extended community attribute, that is, a specific value of content of the type field is similar to the value of the second route type field in instance 5, and may be another numerical value except a numerical value used in an existing standard. The second state indication field is an "Ethernet segment identifier state" (ESI State) field in FIG. 6e, and the second extended community attribute further includes a sub-type (Sub-Type) field (a "sub-type (to be determined)" field in FIG. 6e), a flag (Flags) field (a "flag (1 byte)" field in FIG. 6e), and a reserved (Reserved=0) field (a "Reserved=0" field in FIG. 6e). The second extended community attribute may also be implemented by using an existing extended community attribute, and referring to FIG. 6f, content of the type field is a numerical value already used in an existing standard, for example, 0x06. In this case, the extended community attribute further includes a sub-type (Sub-Type) field (a "sub-type (to be determined)" field in FIG. 6f), a reserved (Reserved=0) field (a "Reserved=0" field in FIG. 6f), and an Ethernet segment identifier label (ESI Label) field (an "Ethernet segment identifier label" field in FIG. 6f), and the second state indication field is 1 bit in a specified position in the flag (Flags) field (a "flag (1 byte)" field in FIG. 6f), for example, an "S" field in FIG. 6f.

The content of the second route type (Route Type) field (a "route type" field in FIG. 6e) in the second EVPN NLRI is 1, which indicates that a type of the EVPN NLRI is an Ethernet Auto-Discovery (A-D) route, where the content of the second route type field carries the RD and the ESI of the EVI.

The second RD field is carried in a set of data structures in a fixed format in a route type specific (Route Type specific) field in FIG. 6e, and the data structures further include an Ethernet segment identifier (Ethernet Segment Identifier) field (an "Ethernet segment identifier" field in FIG. 6e), an Ethernet tag identifier (Ethernet Tag ID) field (an "Ethernet tag identifier" field in FIG. 6e), and a multi-protocol label switching label (MPLS Label) field (a "multiprotocol label switching label" field in FIG. 6e).

Figure 6G:
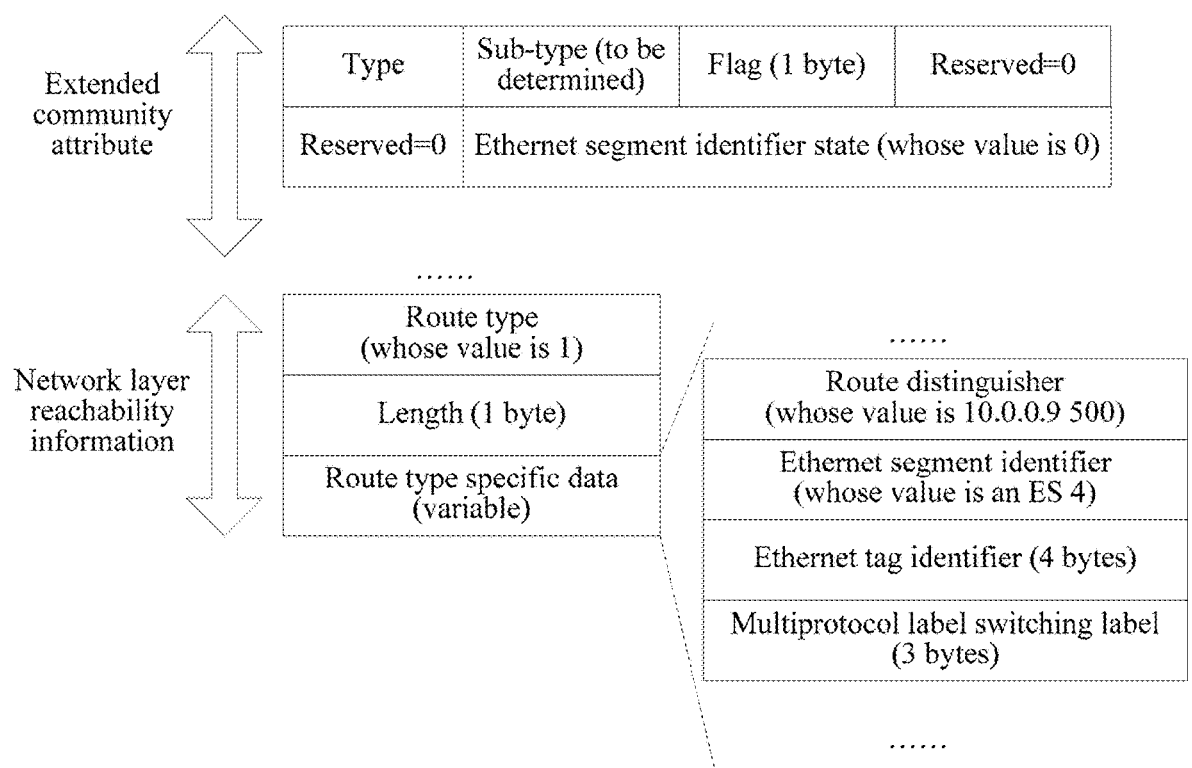
FIG. 6g is a schematic diagram of an example of a second BGP UPDATE message in Example 6 according to an embodiment of the present application.
Figure 6H:
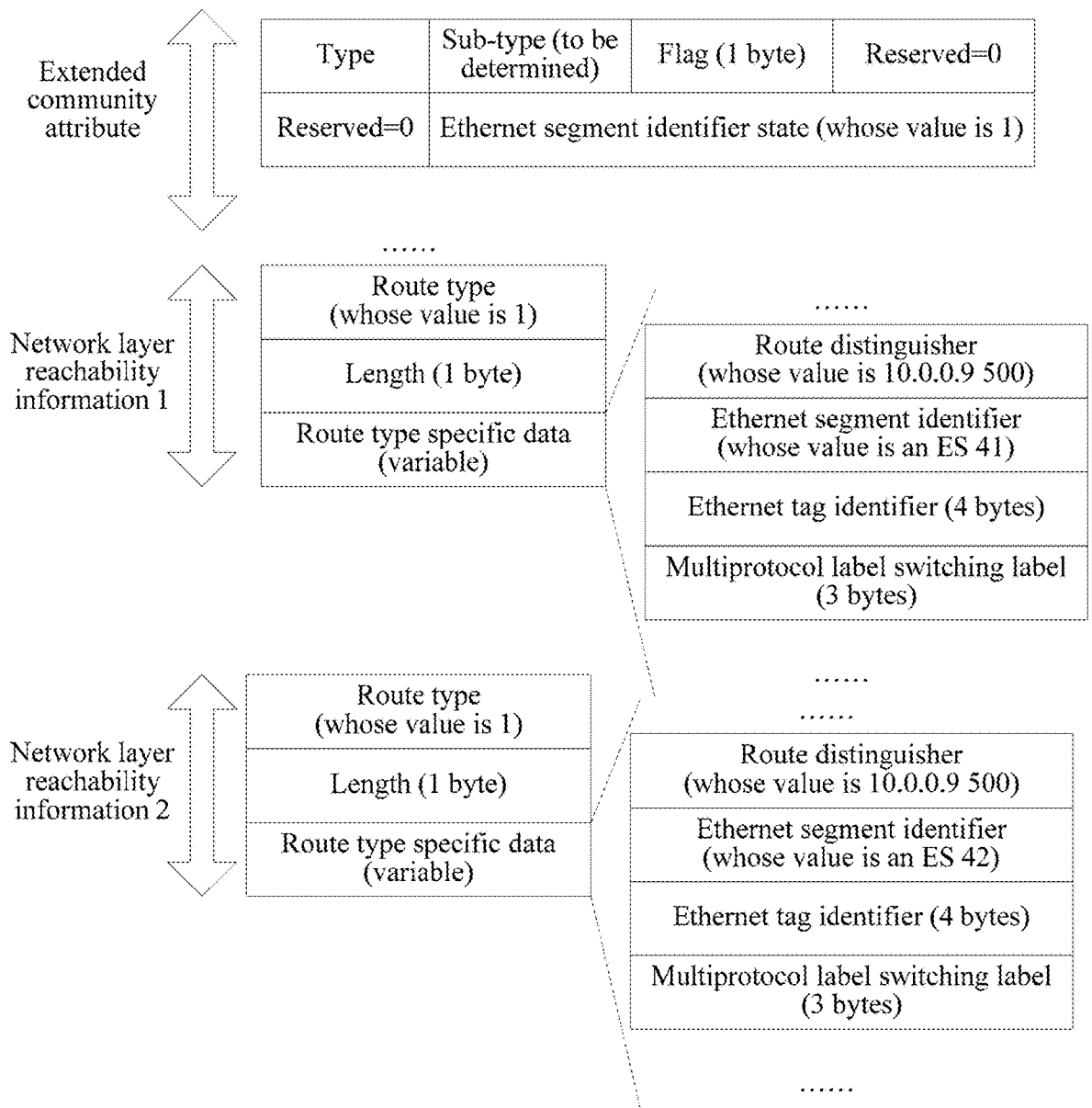
FIG. 6h is a schematic diagram of an example of another second BGP UPDATE message in Example 6 according to an embodiment of the present application.

It is assumed that, in a scenario in which there are two Egress PEs, the Ingress PE is a PE 1, and the Egress PEs are a PE 2 and a PE 3. Assuming that three ESs (which are an ES 4, an ES 41, and an ES42 separately) exist in an EVI corresponding to an EVPN A on the PE 2, the PE 2 determines that a state corresponding to the ES 4 is Active and states corresponding to the ES41 and the ES42 are Inactive. The PE 2 generates two second BGP UPDATE messages, which are separately recorded as a second BGP UPDATE message A and a second BGP UPDATE message B. The second BGP UPDATE message A is used to carry information about the ES whose state is Active, and the second BGP UPDATE message B is used to carry information about the ES whose state is Inactive. Specifically, the second BGP UPDATE message A is shown in FIG. 6g, and includes one piece of EVPN NLRI, content of a type field in a second extended community attribute of the second BGP UPDATE message A indicates that the second extended community attribute carries state information, and content of a state field of an Ethernet segment identifier is 0, which indicates that the state of the ES in the EVPN NLRI of the second BGP UPDATE message A is Active. A Route Type specific field in the EVPN NLRI includes a set of data, which is used to describe one ES. The RD field in the set of data carries the RD of the EVI corresponding to the EVPN A on the PE 2, for example, "10.0.0.9 500", and content of the ESI field is "ES 4". The second BGP UPDATE message B is shown in FIG. 6h, and includes two pieces of EVPN NLRI, content of a type field in a second extended community attribute of the second BGP UPDATE message B indicates that the second extended community attribute carries state information, and content of a state field of an Ethernet segment identifier is 1, which indicates that the state of the ES in the EVPN NLRI of the second BGP UPDATE message B is Inactive. A Route Type specific field in a first piece of EVPN NLRI of the second BGP UPDATE message B includes a set of data, which is used to describe one ES, an RD field in the set of data carries the RD of the EVI corresponding to the EVPN A on the PE 2, for example, "10.0.0.9 500", and content of an ESI field is "ES41". A Route Type specific field in a second piece of EVPN NLRI includes a set of data, which is used to describe one ES, an RD field in this set of data carries the RD of the EVI corresponding to the EVPN A on the PE 2, for example, "10.0.0.9 500", and content of the ESI field is "ES42". It can be understood by a person skilled in the art that, when there is only one ES in the EVI on the Egress PE, one second BGP UPDATE message may only include one piece of EVPN NLRI that carries information about one ES. When there are multiple ESs in the EVI on the Egress PE, one second BGP UPDATE message may include multiple pieces of EVPN NLRI, where each piece of EVPN NLRI carries information of one ES. After receiving the second BGP UPDATE message A sent by the PE 2, the PE 1 determines that the state of the ES 4 in the EVI corresponding to the EVPN A on the PE 2 is Active; therefore, it is determined that the state of the EVI corresponding to the EVPN A on the PE 2 is Active.

Figure 6I:
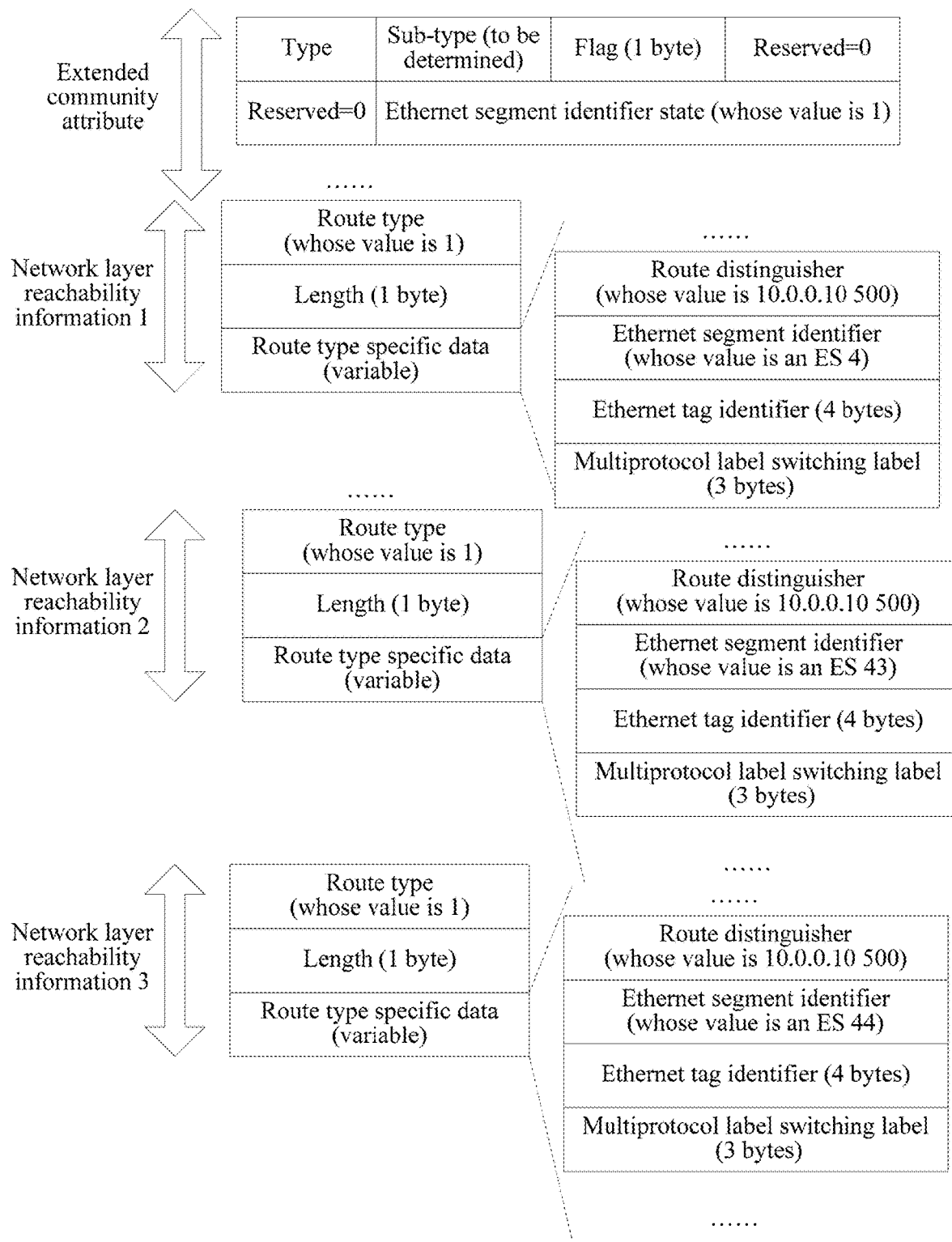
FIG. 6i is a schematic diagram of an example of another second BGP UPDATE message in Example 6 according to an embodiment of the present application.

Similarly, assuming that three ESs (which are an ES 4, an ES 43, and an ES 44 separately) exist in the EVI corresponding to the EVPN A on the PE 3, the PE 3 determines that a state corresponding to each of the ES 4, the ES 43, and the ES 44 is Inactive. The PE 3 generates two second BGP UPDATE messages, which are recorded as second BGP UPDATE messages C. The second BGP UPDATE messages C are shown in FIG. 6i. After receiving the second BGP UPDATE messages C sent by the PE 3, the PE 1 determines that the state of each of the ES 4, the ES 43, and the ES 44 in the EVI corresponding to the EVPN A on the PE 3 is Inactive; therefore, it is determined that the state of the EVI corresponding to the EVPN A on the PE 3 is Inactive.

An existing BGP UPDATE message is extended by using the manner, which is provided in this instance, for indicating a state of an ES by a second BGP UPDATE message. Content used to describe the first type field in an extended community attribute of the EVPN NLRI indicates that the extended community attribute carries state information. A state indication field is newly added to the extended community attribute, and content, which is different values, of the state indication field separately indicates that the states of the ESs are Active and Inactive. The Ingress PE receives the second BGP UPDATE message in this instance, and may determine, according to the RD field and the ESI field that are in the EVPN NLRI of the second BGP UPDATE message, and the state indication field in the extended community attribute, the state of the ES in the EVI on the Egress PE sending the second BGP UPDATE message, so that the state of the EVI on the Egress PE is further determined.

It should be noted that, multiple manners for determining a state of an EVPN instance on an Egress PE device by an Ingress PE are provided in this embodiment; in a scenario in which multiple Egress PEs exist in an EVI, multiple different Egress PEs may generate and send a BGP UPDATE message in a manner provided in the foregoing same embodiment. And correspondingly, the Ingress PE determines a state of the EVI on the Egress PE in a manner provided in the foregoing same embodiment. Multiple different Egress PEs may separately generate and send BGP UPDATE messages in manners provided in different examples, and correspondingly, the Ingress PE determines a state of the EVI on the Egress PE in manners provided in different examples. It is assumed that in a scenario in which there are two Egress PEs, a first Egress PE and a second Egress PE send first BGP UPDATE messages to the Ingress PE in the manner provided in example 2, and the Ingress PE separately determines states of EVIs on the first Egress PE and the second Egress PE in the manner in example 2. Or, a first Egress PE sends a first BGP UPDATE message to the Ingress PE in the manner in example 2, and the Ingress PE determines a state of an EVI on the first Egress PE in the manner in example 2. Additionally, a second Egress PE sends a second BGP UPDATE message to the Ingress PE in a manner provided in example 5, and the Ingress PE determines a state of an EVI on the second Egress PE in a manner in example 5.

Figure 7:
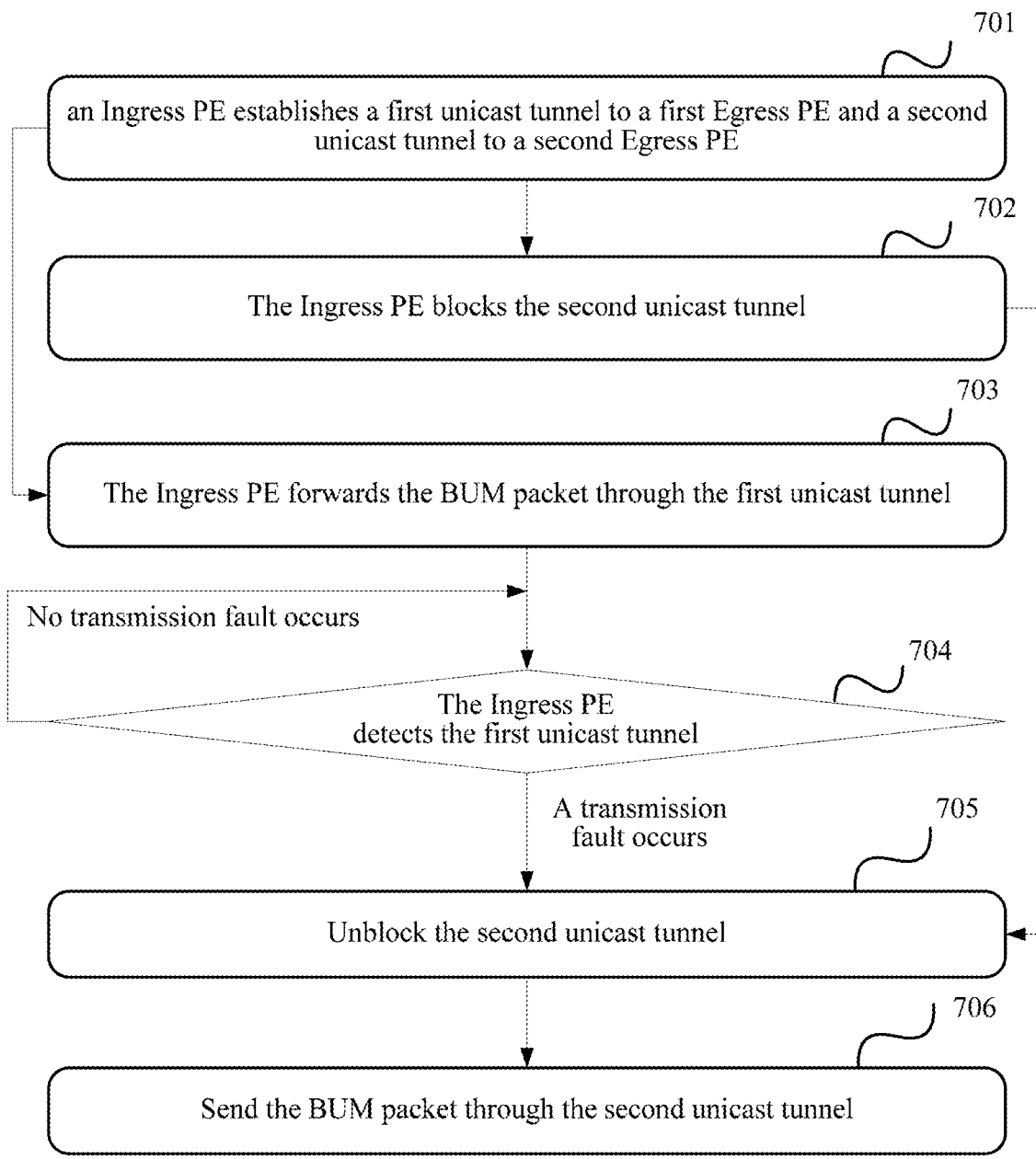
FIG. 7 is a flowchart of another packet forwarding method according to an embodiment of the present application.

Optionally, a specific implementation manner of the "skipping, by the Ingress PE, forwarding a BUM packet to the second Egress PE, and forwarding, by the Ingress PE, the BUM packet to a first Egress PE" in step 21 in FIG. 2 includes, but is not limited to, the following two:

A first implementation manner is as follows:

As shown in FIG. 7, before step 21, the packet forwarding method further includes:

Step 701: An Ingress PE establishes a first unicast tunnel to a first Egress PE and a second unicast tunnel to a second Egress PE.

Correspondingly, the "skipping, by the Ingress PE, forwarding a BUM packet to the second Egress PE" in step 21 is specifically step 702, which is: The Ingress PE blocks the second unicast tunnel. More specifically, the Ingress PE blocks a BUM packet at an ingress interface of the second unicast tunnel, and does not forward the BUM packet to the second Egress PE through the second unicast tunnel.

The "skipping, by the Ingress PE, forwarding a BUM packet to the second Egress PE" in step 21 is specifically step 703, which is: The Ingress PE forwards a BUM packet through the first unicast tunnel.

It should be noted that, it is feasible as long as step 702 and step 703 are performed after step 701, and an order of performing step 702 and step 703 is not limited.

Further, in order to improve reliability of packet transmission, after step 703, the packet forwarding method further includes:

Step 704: The Ingress PE detects the first unicast tunnel, for example, traffic at a tunnel ingress interface is detected according to a preset detection period; if it is detected that a transmission fault occurs on the first unicast tunnel, enter step 705; otherwise, continue to perform detection.

Step 705: Unblock the second unicast tunnel.

Step 706: Send the BUM packet through the second unicast tunnel.

That is, in this implementation manner, the Ingress PE establishes a first unicast tunnel to a first Egress PE for which a state of an EVI is Active and a second unicast tunnel to a second Egress PE for which a state of an EVI is Inactive, forwards a BUM packet through the first unicast tunnel, blocks the second unicast tunnel, and when a fault occurs on the first unicast tunnel, forwards the BUM packet through the second unicast tunnel.

Figure 8:
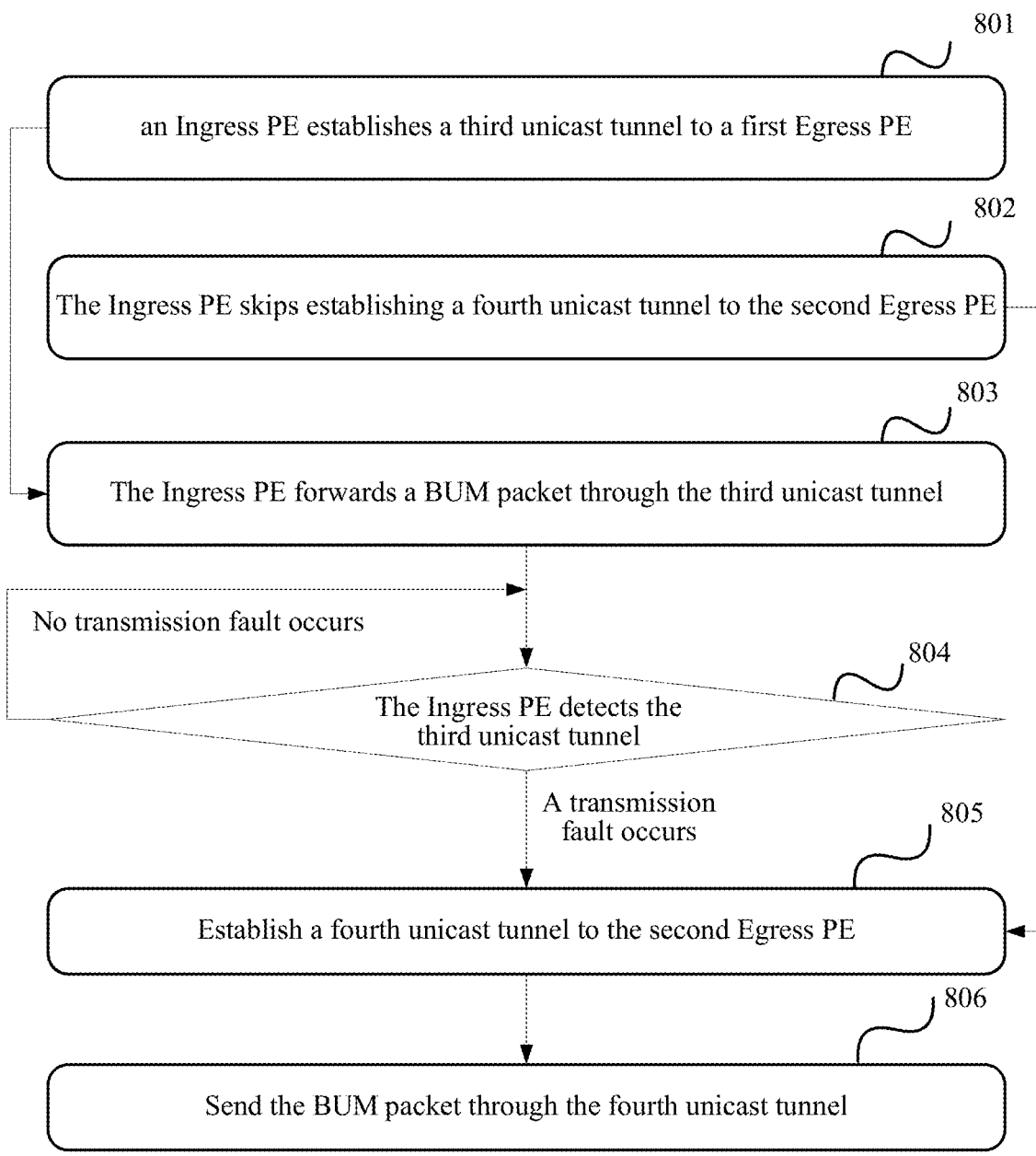
FIG. 8 is a flowchart of another packet forwarding method according to an embodiment of the present application.

A second implementation manner is as follows:

As shown in FIG. 8, before step 21, the packet forwarding method further includes:

Step 801: An Ingress PE establishes a third unicast tunnel to a first Egress PE.

Correspondingly, the "skipping, by the Ingress PE, forwarding a BUM packet to the second Egress PE" in step 21 is specifically step 802, which is: The Ingress PE skips establishing a fourth unicast tunnel to the second Egress PE.

The "skipping, by the Ingress PE, forwarding a BUM packet to the second Egress PE" in step 21 is specifically step 803, which is: The Ingress PE forwards a BUM packet through the third unicast tunnel.

Further, in order to improve reliability of packet transmission, after step 803, the packet forwarding method further includes:

Step 804: The Ingress PE detects the third unicast tunnel, for example, traffic at a tunnel ingress interface is detected according to a preset detection period; if it is detected that a transmission fault occurs on the third unicast tunnel, enter step 805; otherwise, continue to perform detection.

Step 805: Establish a fourth unicast tunnel to the second Egress PE.

Step 806: Send the BUM packet through the fourth unicast tunnel.

That is, in this implementation manner, when a tunnel is established initially, the Ingress PE establishes a third unicast tunnel only to a first Egress PE for which a state of an EVI is Active, and forwards a BUM packet through the third unicast tunnel; when a fault occurs on a first unicast tunnel, the Ingress PE then establishes a fourth unicast tunnel to a second Egress PE for which a state of an EVI is Inactive, and forwards the BUM packet through the fourth unicast tunnel.

In the packet forwarding method provided in this embodiment of the present application, an Ingress PE in an EVI determines states of EVIs on at least two Egress PEs, forwards a BUM packet to an Egress PE for which the state of the EVI is Active, and skips forwarding the BUM packet to an Egress PE for which the state of the EVI is Inactive, which differs from the prior art in which an Ingress PE forwards a BUM packet to each Egress PE; therefore, repeated BUM traffic transmitted in a bearer network is reduced, and network transmission resources are reduced.

Figure 9:
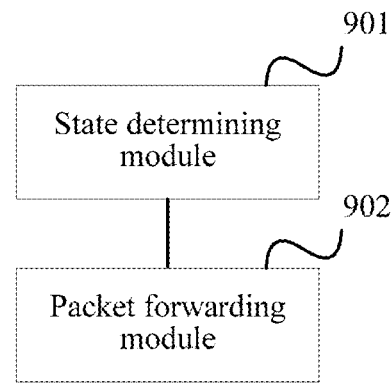
FIG. 9 is a schematic structural diagram of a packet forwarding apparatus according to an embodiment of the present application.

Correspondingly, an embodiment of the present application further provides a packet forwarding apparatus. As shown in FIG. 9, the apparatus may be integrated in an Ingress PE in an EVI. The packet forwarding apparatus includes a state determining module 901 and a packet forwarding module 902, and details are provided below:

The state determining module 901 is configured to determine a state of an EVI on a first Egress PE and a state of the EVI on a second Egress PE, where an EVPN corresponding to the EVI includes a first CE.

The packet forwarding module 902 is configured to: when the state determining module 901 determines that the state of the EVI on the first Egress PE is Active and the state of the EVI on the second Egress PE is Inactive, skip forwarding a broadcast, unknown unicast, and multicast (BUM) packet to the second Egress PE, where the BUM packet is from the first CE; and forward the BUM packet to the first Egress PE.

Figure 10A:
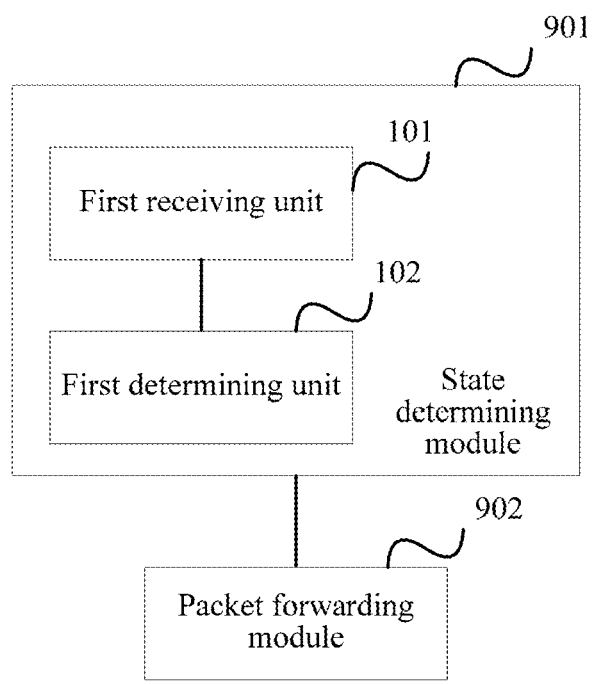
FIG. 10a is a schematic structural diagram of another packet forwarding apparatus according to an embodiment of the present application.

Optionally, referring to FIG. 10a, the state determining module 901 includes:

a first receiving unit 101, configured to receive a first BGP UPDATE message sent by the first Egress PE, where the first BGP UPDATE message indicates that the state of the EVI on the first Egress PE is Active; and a first determining unit 102, configured to determine, according to the first BGP UPDATE message received by the first receiving unit 101, that the state of the EVI on the first Egress PE is Active.

Further, the first receiving unit 101 in FIG. 10a is further configured to receive a first BGP UPDATE message sent by the second Egress PE, where the first BGP UPDATE message sent by the second Egress PE indicates that the state of the EVI on the second Egress PE is Inactive; the first determining unit 102 is further configured to determine, according to the first BGP UPDATE message that is received by the first receiving unit 101 and is sent by the second Egress PE, that the state of the EVI on the second Egress PE is Active.

For a specific working process of the determining unit 102, refer to descriptions of the first manner for determining a state of an EVI on an Egress PE device by an Ingress PE in the foregoing method embodiment, and details are not provided herein again.

Figure 10B:
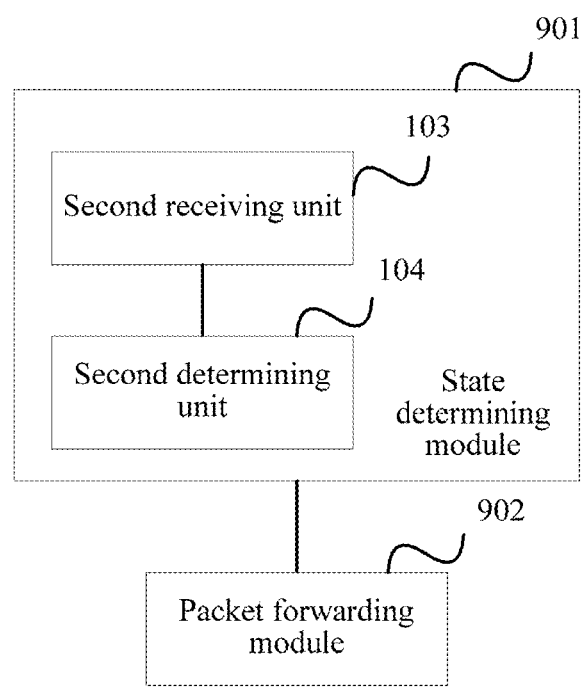
FIG. 10b is a schematic structural diagram of another packet forwarding apparatus according to an embodiment of the present application.

Optionally, referring to FIG. 10b, the state determining module 901 includes:

a second receiving unit 103, configured to receive a second BGP UPDATE message sent by the first Egress PE, where the second BGP UPDATE message indicates a state of a first Ethernet segment ES; when the state of the first ES is Active, it indicates that the first ES is used to forward the BUM packet; when the state of the first ES is Inactive, it indicates that the first ES is not used to forward a BUM packet; the EVI on the first Egress PE is connected to a second CE by using the first ES; and the EVPN includes the second CE; and a second determining unit 104, configured to: when there are multiple first ESs and a state of at least one ES of the first ESs is Active, determine, according to the second BGP UPDATE message received by the second receiving unit 103, that the state of the EVI on the first Egress PE is Active.

Further, the second receiving unit 103 in FIG. 10b is further configured to receive a second BGP UPDATE message sent by the second Egress PE, where the second BGP UPDATE message sent by the second Egress PE indicates a state of a second Ethernet segment ES; when the state of the second ES is Active, it indicates that the second ES is used to forward the BUM packet; when the state of the second ES is Inactive, it indicates that the second ES is not used to forward the BUM packet; the EVI on the second Egress PE is connected to the second CE by using the second ES; and the second determining unit 104 is further configured to: when there are multiple second ESs and a state of each second ES is Inactive, determine, according to the second BGP UPDATE message that is sent by the second Egress PE and received by the second receiving unit 103, that the state of the EVI on the second Egress PE is Inactive.

For a specific working process of the determining unit 104, refer to descriptions of the second manner for determining a state of an EVI on an Egress PE device by an Ingress PE in the foregoing method embodiment, and details are not provided herein again.

Figure 11A:
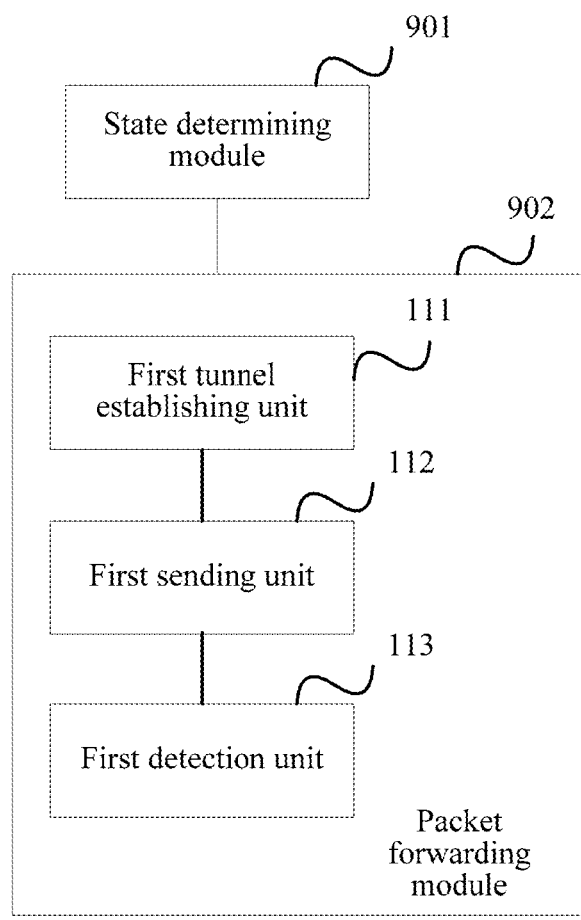
FIG. 11a is a schematic structural diagram of another packet forwarding apparatus according to an embodiment of the present application.

As shown in FIG. 11a, the packet forwarding module 902 in FIG. 9 includes:

a first tunnel establishing unit 111, configured to establish a first unicast tunnel to the first Egress PE and a second unicast tunnel to the second Egress PE; and a first sending unit 112, configured to block the second unicast tunnel established by the first tunnel establishing unit 111, and forward the BUM packet through the first unicast tunnel established by the first tunnel establishing module 111.

Further, in order to improve reliability of packet transmission, the packet forwarding module 902 in FIG. 11a further includes: a first detection unit 113, configured to detect the first unicast tunnel established by the first tunnel establishing unit 111; if it is detected that a transmission fault occurs on the first unicast tunnel, unblock the second unicast tunnel; and trigger the first sending module 112 to forward the BUM packet through the second unicast tunnel.

Figure 11B:
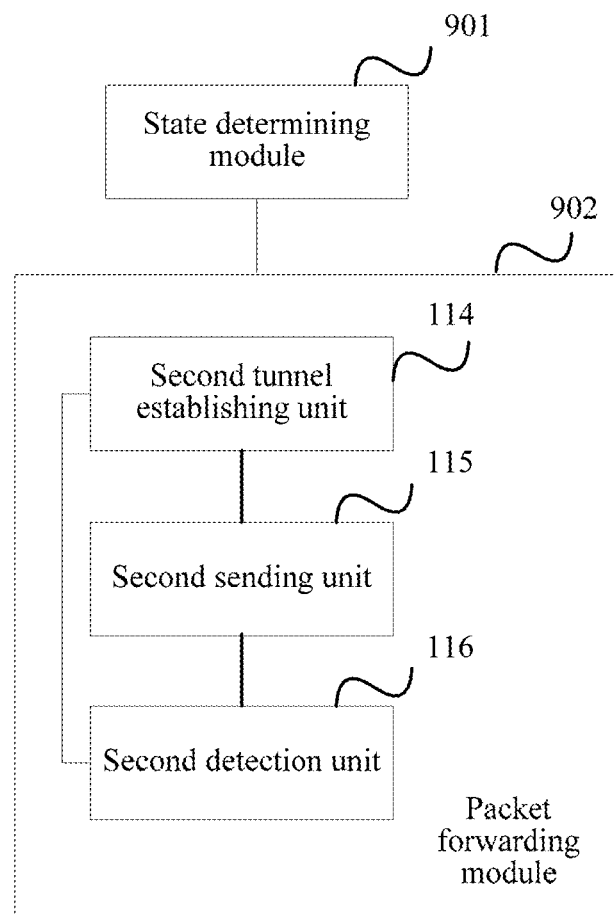
FIG. 11b is a schematic structural diagram of another packet forwarding apparatus according to an embodiment of the present application.

As shown in FIG. 11b, the packet forwarding module 902 in FIG. 9 includes:

a second tunnel establishing unit 114, configured to establish a third unicast tunnel to the first Egress PE, and skip establishing a fourth unicast tunnel to the second Egress PE; and a second sending unit 115, configured to forward the BUM packet through the third unicast tunnel established by the second tunnel establishing unit 114.

Further, the packet forwarding module 902 in FIG. 11b further includes: a second detection unit 116, configured to detect the third unicast tunnel established by the second tunnel establishing unit 114; and if it is detected that a transmission fault occurs on the third unicast tunnel, trigger the second tunnel establishing unit 114 to establish the fourth unicast tunnel to the second Egress PE, where the second sending unit 115 is further configured to forward the BUM packet through the fourth unicast tunnel.

Optionally, based on the apparatus shown in FIG. 9, additional accessorial units in FIG. 10a as well as FIG. 11a and FIG. 11b may be combined with each other, and additional accessorial units in FIG. 10b as well as FIG. 11a and FIG. 11b may also be combined with each other, to obtain a packet forwarding apparatus having more comprehensive functions.

The packet forwarding apparatus provided in this embodiment of the present application determines states of EVIs on at least two Egress PEs, forwards a BUM packet to an Egress PE for which a state of an EVI is Active, and skips forwarding the BUM packet to an Egress PE for which a state of the EVI is Inactive, which differs from the prior art in which an Ingress PE forwards a BUM packet to each Egress PE; therefore, repeated BUM traffic transmitted in a bearer network is reduced, and network transmission resources are reduced.

Figure 3:
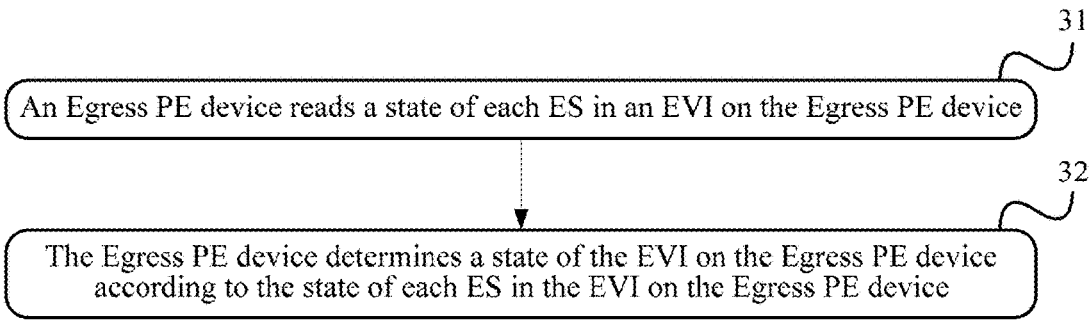
FIG. 3 is a schematic diagram of determining, by an Egress PE device, a state of an EVI on the Egress PE device according to an embodiment of the present application.
Figure 12:
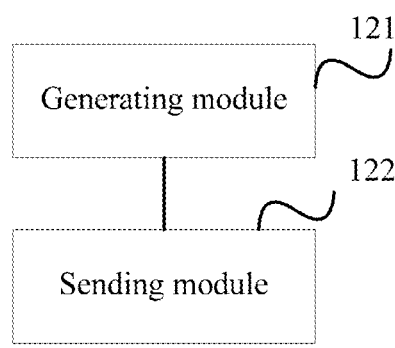
FIG. 12 is a schematic structural diagram of another packet forwarding apparatus according to an embodiment of the present application.

Referring to FIG. 12, an embodiment of the present application further provides another packet forwarding apparatus. The apparatus may be integrated in an Egress PE in an EVI, and includes:

a generating module 121, configured to generate a BGP UPDATE message, where the BGP UPDATE message indicates that a state of an EVI on the apparatus is Active or Inactive; where the state of the EVI on the apparatus may be determined in the manner described in FIG. 3 and the corresponding method embodiment; and a sending module 122, configured to send the BGP UPDATE message generated by the generating module 121 to an Ingress PE in the EVI.

For a field format of the BGP UPDATE message in this embodiment, refer to descriptions of a first BGP UPDATE message in Example 1 to Example 3 in the method embodiment and corresponding FIG. 4a to FIG. 4c, and details are not provided herein again.

Figure 13:
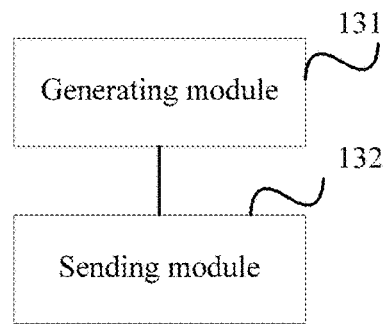
FIG. 13 is a schematic structural diagram of another packet forwarding apparatus according to an embodiment of the present application.

Referring to FIG. 13, an embodiment of the present application further provides another packet forwarding apparatus. The apparatus may be integrated in an Egress PE in an EVI, and includes:

a generating module 131, configured to generate a BGP UPDATE message, where the BGP UPDATE message indicates a state of a first ES; when the state of the ES is Active, it indicates that the ES is used to forward a BUM packet; when the state of the ES is Inactive, it indicates that the ES is not used to forward the BUM packet; an EVI on the Egress PE is connected to a CE by using the ES; and an EVPN corresponding to the EVI includes the CE, where the state of the ES on the apparatus may be determined in the manner described in FIG. 3 and the corresponding method embodiment; and a sending module 132, configured to send the BGP UPDATE message generated by the generating module 131 to an Ingress PE in the EVI.

For a field format of the BGP UPDATE message in this embodiment, refer to descriptions of a second BGP UPDATE message in Example 4 to Example 6 in the method embodiment and corresponding FIG. 6a to FIG. 6i, and details are not provided herein again.

The packet forwarding apparatus provided in this embodiment of the present application generates a BGP UPDATE message indicating that a state of an EVI on the packet forwarding apparatus is Active or Inactive, and sends the BGP UPDATE message to an Ingress PE in the EVI. Or the apparatus generates a BGP UPDATE message that indicates a state of an ES, and sends the BGP UPDATE message to an Ingress PE in an EVI. Therefore, the Ingress PE can determine states of EVIs on at least two Egress PEs according to the BGP UPDATE message, forward a BUM packet to an Egress PE for which the state of the EVI is Active, and skip forwarding the BUM packet to an Egress PE for which the state of the EVI is Inactive, which differs from the prior art in which an Ingress PE forwards a BUM packet to each Egress PE. Thus, repeated BUM traffic transmitted in a bearer network is reduced, and network transmission resources are reduced.

The present application further provides a packet forwarding system, and for a specific deployment diagram thereof, refer to FIG. 1. The packet forwarding system includes an Ingress PE, a first Egress PE, and a second Egress PE that are in an EVI, where the Ingress PE determines that a state of the EVI on the first Egress PE is Active, where an EVPN corresponding to the EVI includes a first CE. The Ingress PE is further configured to determine that the state of the EVI on the second Egress PE is Inactive; skip forwarding a broadcast, unknown unicast, and multicast (BUM) packet to the second Egress PE, where the BUM packet is from the first CE; and forward the BUM packet to the first Egress PE.

Optionally, the first Egress PE in the packet forwarding system is configured to generate a first BGP UPDATE message, where the BGP UPDATE message indicates that the state of the EVI on the Egress PE is Active; and send the first BGP UPDATE message to the Ingress PE; and correspondingly, the Ingress PE is configured to determine, according to the first BGP UPDATE message, that the state of the EVI on the first Egress PE is Active.

Optionally, the first Egress PE in the packet forwarding system is configured to generate a second BGP UPDATE message, where the second BGP UPDATE message indicates a state of a first ES. When the state of the first ES is Active, it indicates that the first ES is used to forward the BUM packet; when the state of the first ES is Inactive, it indicates that the first ES is not used to forward the BUM packet. The EVI on the first Egress PE is connected to a second CE by using the first ES; and the EVPN includes the second CE. The first Egress PE is further configured to send the second BGP UPDATE message to the Ingress PE; and correspondingly, when there are multiple first ESs and a state of at least one ES of the first ESs is Active, the Ingress PE is configured to determine, according to the received second BGP UPDATE message, that the state of the EVI on the first Egress PE is Active.

Optionally, the second Egress PE in the packet forwarding system is configured to generate a first BGP UPDATE message, where the first BGP UPDATE message generated by the second Egress PE indicates that the state of the EVI on the second Egress PE is Inactive. And send the first BGP UPDATE message generated by the second Egress PE to the Ingress PE. Correspondingly, the Ingress PE is configured to determine, according to the first BGP UPDATE message sent by the second Egress PE, that the state of the EVI on the second Egress PE is Inactive.

Optionally, the second Egress PE in the packet forwarding system is configured to generate a second BGP UPDATE message, where the second BGP UPDATE message generated by the second Egress PE indicates a state of a second ES. When the state of the second ES is Active, it indicates that the second ES is used to forward the BUM packet. When the state of the second ES is Inactive, it indicates that the second ES is not used to forward the BUM packet. The EVI on the second Egress PE is connected to a second CE by using the second ES; and the EVPN includes the second CE; and the second Egress PE is further configured to send the second BGP UPDATE message generated by the second Egress PE to the Ingress PE. Correspondingly, when there are multiple second ESs and a state of each second ES is Inactive, the Ingress PE is configured to determine, according to the received second BGP UPDATE message sent by the second Egress PE, that the state of the EVI on the second Egress PE is Inactive.

For structures and working processes of the Ingress PE and the Egress PE in the packet forwarding system provided in this embodiment of the present application, reference may be made to the introductions in the foregoing method embodiments and apparatus embodiments, and details are not provided herein again. The Egress PE in the packet forwarding system generates a first BGP UPDATE message indicating that a state of an EVI on the Egress PE is Active or Inactive, and sends the first BGP UPDATE message to an Ingress PE in the EVI; or generates a second BGP UPDATE message indicating a state of an ES, and sends the second BGP UPDATE message to an Ingress PE in an EVI. Therefore, the Ingress PE can determine states of EVIs on at least two Egress PEs according to the first BGP UPDATE message or the second BGP UPDATE message, forward a BUM packet to an Egress PE for which the state of the EVI is Active, and skip forwarding the BUM packet to an Egress PE for which the state of the EVI is Inactive, which differs from the prior art in which an Ingress PE forwards a BUM packet to each Egress PE. Therefore, repeated BUM traffic transmitted in a bearer network is reduced, and network transmission resources are reduced.

Figure 14:
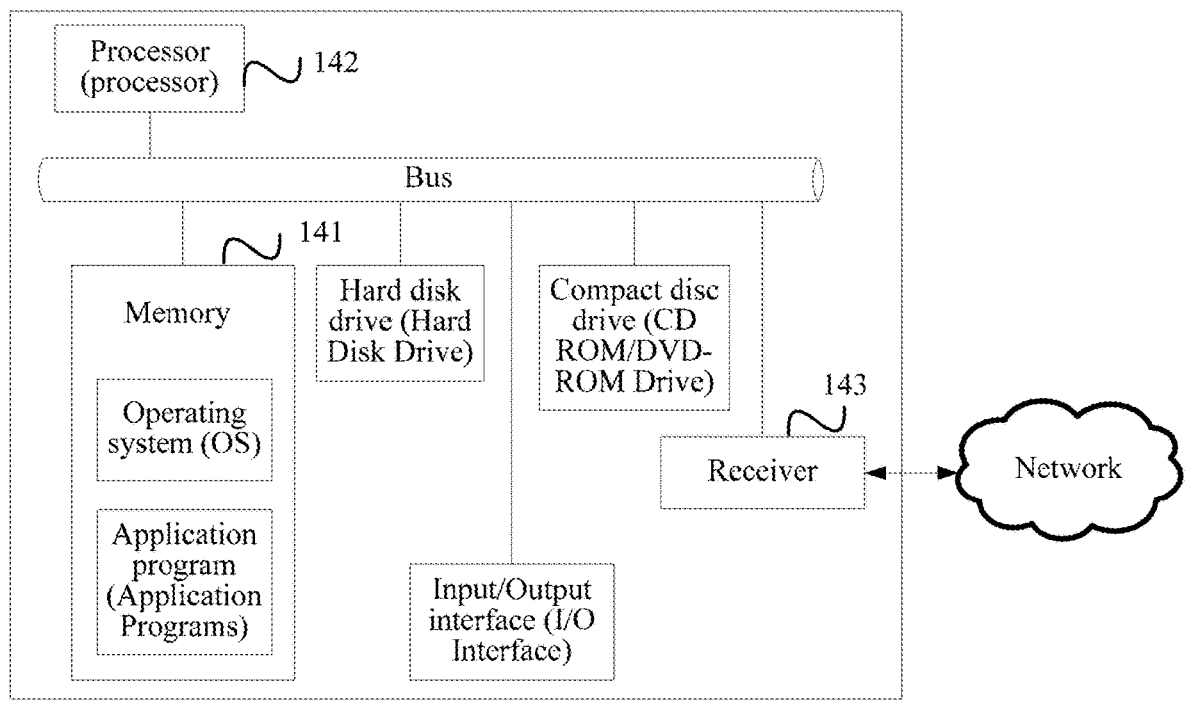
FIG. 14 is a schematic structural diagram of a PE according to an embodiment of the present application.

Referring to FIG. 14, an embodiment of the present application further provides a PE, where the PE may be used as an Ingress PE in an EVI, and includes a memory 141 and a processor 142. The memory 141 is configured to store program code, and the processor 142 is configured to: after the program code stored in the memory 141 is read, execute the following functions: determining that a state of an EVI on a first Egress PE is Active, where an EVPN corresponding to the EVI includes a first CE; determining that a state of the EVI on the second Egress PE is Inactive; skipping forwarding a BUM packet to the second Egress PE, where the BUM packet is from the first CE; and forwarding the BUM packet to the first Egress PE.

Optionally, the PE further includes a receiver 143, configured to receive a first BGP UPDATE message sent by the first Egress PE, where the first BGP UPDATE message indicates that the state of the EVI on the first Egress PE is Active. Correspondingly, the processor 142 is configured to determine, according to the first BGP UPDATE message received by the receiver 143, that the state of the EVI on the first Egress PE is Active. The receiver 143 is configured to receive a second BGP UPDATE message sent by the first Egress PE, where the second BGP UPDATE message indicates a state of a first Ethernet segment ES. When the state of the first ES is Active, it indicates that the first ES is used to forward the BUM packet. When the state of the first ES is Inactive, it indicates that the first ES is not used to forward the BUM packet. The EVI on the first Egress PE is connected to a second CE by using the first ES, and the EVPN includes the second CE. Correspondingly, the processor 142 is configured to: when there are multiple first ESs and a state of at least one ES of the first ESs is Active, determine, according to the second BGP UPDATE message received by the second receiving unit, that the state of the EVI on the first Egress PE is Active.

For a detailed process of performing the foregoing steps by the processor 142, refer to the descriptions of the method embodiments. For a field format of the first BGP UPDATE message, refer to descriptions of Example 1 to Example 3 and FIG. 4a to FIG. 4c. For a field format of a second BGP UPDATE message, refer to descriptions of Example 4 to Example 7 and FIG. 6a to FIG. 6i, and details are not provided herein again.

Figure 15:
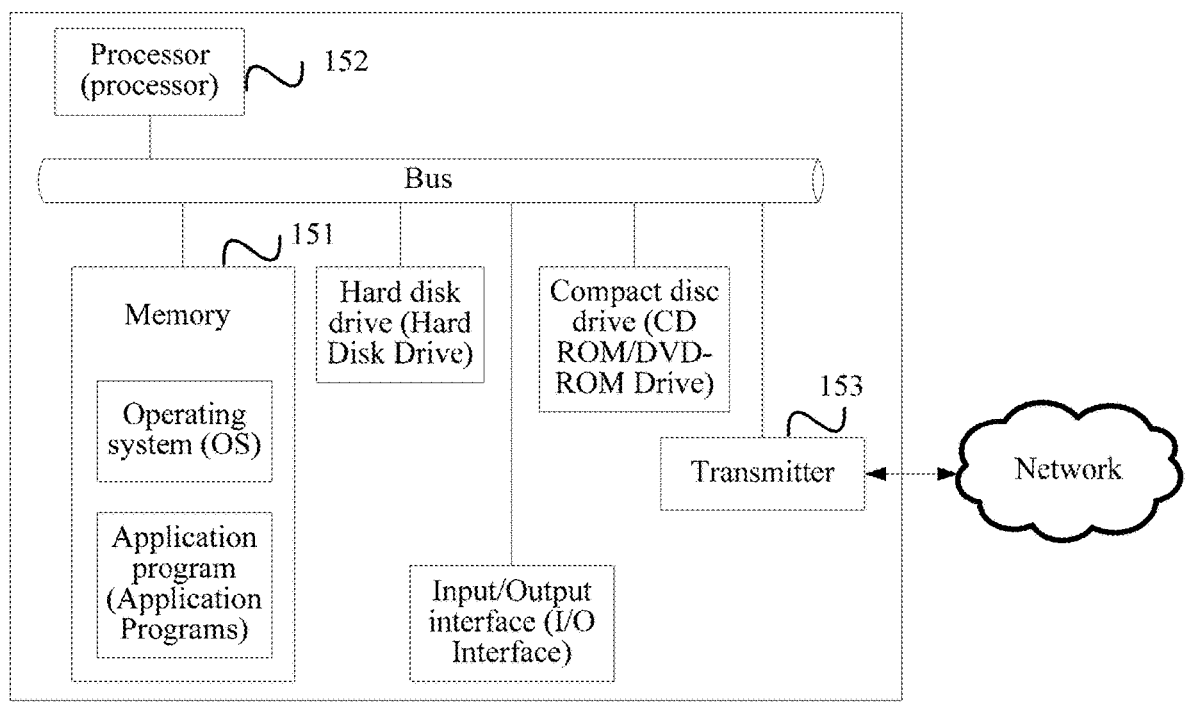
FIG. 15 is a schematic structural diagram of a PE according to an embodiment of the present application.

Referring to FIG. 15, an embodiment of the present application further provides a PE, where the PE in an EVI may be used as an Egress PE, and includes a memory 151, a processor 152, and a transmitter 153, where the memory 151 is configured to store program code. The processor 152 is configured to: after the program code stored in the memory 151 is read, execute the following functions: generating a BGP UPDATE message, where the BGP UPDATE message indicates that a state of the EVI on the PE is Active or Inactive; and the transmitter 153 is configured to send the BGP UPDATE message to an Ingress PE in the EVI.

For a field format of the BGP UPDATE message in this embodiment, refer to descriptions of a first BGP UPDATE message in Example 1 to Example 3 in the method embodiment and corresponding FIG. 4a to FIG. 4c, and details are not provided herein again.

An embodiment of the present application further provides a PE, where the PE in an EVI may be used as an Egress PE, and includes a memory 161, a processor 162, and a transmitter 163, where the memory 161 is configured to store program code. The processor 162 is configured to: after the program code stored in the memory 161 is read, execute the following functions: generating a BGP UPDATE message, where the BGP UPDATE message indicates a state of an ES. When the state of the ES is Active, it indicates that the ES is used to forward a BUM packet, When the state of the ES is Inactive, it indicates that the ES is not used to forward the BUM packet. The EVI on the PE is connected to a CE by using the ES; and an EVPN corresponding to the EVI includes the CE. The transmitter 163 is configured to send the BGP UPDATE message to an Ingress PE in the EVI.

For a field format of the BGP UPDATE message in this embodiment, refer to descriptions of a second BGP UPDATE message in Example 4 to Example 6 in the method embodiment and corresponding FIG. 6a to FIG. 6i, and details are not provided herein again.

A person of ordinary skill in the art may understand that, each aspect of the present application or a possible implementation manner of each aspect may be specifically implemented as a system, a method, or a computer program product. Therefore, each aspect of the present application or a possible implementation manner of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present application or the possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM or flash memory), an optical fiber, and a compact disc read only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

All computer-readable program code may be executed on a user computer, or some may be executed on a user computer as a standalone software package, or some may be executed on a computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may in fact be executed substantially at the same time, or these blocks may sometimes be executed in reverse order.

Obviously, a person skilled in the art can make various modifications and variations to the present application without departing from the spirit and scope of the present application. The present application is intended to cover these modifications and variations provided that they fall within the scope of protection defined by the following claims and their equivalent technologies.

What is claimed is:

1. A packet forwarding method comprising:
receiving, by an ingress provider edge (PE) of an Ethernet virtual private network (EVPN), a first border gateway protocol (BGP) update message sent by a first egress PE of the EVPN, indicating a state of an Ethernet virtual private network instance (EVI) on the first egress PE is active,
wherein the first BGP update message comprises a first network layer reachability information (NLRI) of the EVPN, and
wherein the first NLRI includes (a) a first route type field indicating the first NLRI of the EVPN carries information about the state of the EVI on the first egress PE, (b) a first route distinguisher (RD) field carrying an RD of the EVI on the first egress PE, and (c) a first state indication field having a first value indicating an active state of the EVI on the first egress PE;
determining, by the ingress PE, that a state of the EVI on the first egress PE is active according to the first BGP update message and a state of an EVI on a second egress PE of the EVPN is inactive, wherein the first egress PE comprises a first customer edge (CE) of the EVI of the first egress PE; and
forwarding, by the ingress PE, a broadcast, unknown unicast, and multicast (BUM) packet to the first egress PE, rather than forwarding the BUM packet to the second egress PE, wherein the BUM packet is from the first CE.

2. The method according to claim 1, wherein the first NLRI includes a first extended community attribute comprising the first type field and the first state indication field.

3. The method according to claim 1, wherein determining that the state of the EVI on the first egress PE is active comprises:
receiving, by the ingress PE, a second BGP update message sent by the first egress PE,
wherein the second BGP update message indicates a state of a first Ethernet segment (ES),
wherein, when the state of the first ES is active, the first ES is used to forward the BUM packet and, when the state of the first ES is inactive, the first ES is not used to forward the BUM packet, and
wherein the EVI on the first egress PE is connected to a second CE by using the first ES and the EVPN comprises the second CE; and
determining, by the ingress PE, that the state of the EVI on the first egress PE is active when there are multiple first ESs and a state of at least one ES of the first ESs is active.

4. The method according to claim 3, wherein the second BGP update message comprises a second NLRI of the EVPN comprising a second route type field, a second RD field, an Ethernet signal identifier (ESI) field, and a second state indication field;
wherein a content of the second route type field indicates that the second NLRI of the EVPN carries information about a state of an ES;
wherein the second RD field carries an RD of the EVI on the first egress PE, the ESI field carries a first ESI uniquely identifying the first ES; and
wherein, when content of the second state indication field is a first value, the state of the first ES is active and, when the content of the second state indication field is a second value, the state of the first ES is inactive.

5. The method according to claim 3, wherein the second BGP update message comprises second EVPN network layer reachability information (NLRI) and a second extended community attribute corresponding to the second EVPN NLRI;
wherein the second EVPN NLRI comprises a second route distinguisher (RD) field and an ESI field;
wherein the second extended community attribute comprises a second type field and a second state indication field;
wherein a content of the second type field indicates that the second extended community attribute carries information about a state of an ES;
wherein the second RD field carries an RD of the EVI on the first egress PE;
wherein the ESI field carries a first ESI uniquely identifying the first ES; and
wherein, when content of the second state indication field is a first value, the state of the first ES is active and, when the content of the second state indication field is a second value, the state of the first ES is inactive.

6. In a packet forwarding system including an Ethernet virtual private network instance (EVI) comprising an ingress provider edge (PE), a first egress PE, and a second egress PE of an Ethernet virtual private network (EVPN) comprising a first customer edge (CE), wherein the ingress PE is configured to:
receive a first border gateway protocol (BGP) update message from the second egress PE, wherein the first BGP update message indicates a state of the EVI on the second egress PE is inactive;
receive a second BGP update message from the first egress PE, wherein the second BGP update message indicating a state of a first Ethernet segment (ES) in the EVI connecting the first or second egress PE to a customer edge (CE) of the EVPN, wherein when the state of the first ES is active, the first ES is used to forward the BUM packet and, when the state of the first ES is inactive, the first ES is not used to forward the BUM packet;
determine, according to the first and second BGP update messages, that a state of the EVI on the first egress PE is active and a state of the EVI on a second egress PE is inactive when there are multiple first ESs and a state of at least one ES of the first ESs is active; and
forward a broadcast, unknown unicast, and multicast (BUM) packet to the first egress PE, rather than forwarding the BUM packet to the second egress PE, wherein the BUM packet is from the first CE.

7. A provider edge (PE) device is an ingress PE in an Ethernet virtual private network instance (EVI) of an Ethernet virtual private network (EVPN) that includes a first customer edge (CE) and a second CE, the PE comprising a receiver, a memory and a processor, wherein the memory is configured to store program code, and the processor is configured to execute the program code and cooperate with the receiver to provide at least the following operations:
receiving a second border gateway protocol (BGP) update message sent by a first egress PE, wherein the second BGP update message indicates a state of a first Ethernet segment (ES), an active state causing the first ES to forward a broadcast, unknown unicast and multicast (BUM) packet when the state of the first ES is active and an inactive state causing the first ES to not forward the BUM packet, and wherein the EVI on the first egress PE is connected to the second CE by using the first ES;

determining that a state of the EVI on the first egress PE is active according to the second BGP update message and a state of the EVI on a second egress PE is inactive when there are multiple first ESs and a state of at least one ES of the first ESs is active; and forwarding the BUM packet to the first egress PE, rather than forwarding the BUM packet to the second egress PE, where the BUM packet is from the first CE.

8. The PE of claim 7, wherein the processor is configured to execute the program code and cooperate with the receiver to provide the following further operations:

receiving a first BGP update message sent by the first egress PE, where the first BGP update message indicates that the state of the EVI on the first egress PE is active; and determining, according to the first BGP update message that the state of the EVI on the first egress PE is active.

9. In the packet forwarding system of claim 6, wherein the second BGP update message comprises a second EVPN network layer reachability information (NLRI), the second EVPN NLRI comprises a second route type field, a second route distinguisher (RD) field, an Ethernet signal identifier (ESI) field, and a second state indication field;

wherein content of the second route type field indicates that the second EVPN NLRI carries information about a state of an ES;

wherein the second RD field carries an RD of the EVI on the first egress PE, the ESI field carries a first ESI uniquely identifying the first ES; and wherein, when the content of the second state indication field is a first value, the state of the first ES is active and, when the content of the second state indication field is a second value, the state of the first ES is inactive.

10. In the packet forwarding system of claim 6, wherein the second BGP update message comprises second EVPN network layer reachability information (NLRI) and a second extended community attribute corresponding to the second EVPN NLRI, the second EVPN NLRI comprises a second route distinguisher (RD) field and an Ethernet signal identifier (ESI) field, the second extended community attribute comprises a second type field and a second state indication field;

wherein content of the second type field indicates that the second extended community attribute carries information about a state of an ES, the second RD field carries an RD of the EVI on the first egress PE, and the ESI field carries a first ESI uniquely identifying the first ES; and wherein, when content of the second state indication field is a first value, the state of the first ES is active and, when the content of the second state indication field is a second value, the state of the first ES is inactive.

* * * * *